(12) United States Patent
Gage et al.

(10) Patent No.: US 10,638,372 B2
(45) Date of Patent: Apr. 28, 2020

(54) GEOGRAPHIC DISPERSION OF RADIO ACCESS NETWORK (RAN) NODE FUNCTIONS

(71) Applicants: William Anthony Gage, Stittsville (CA); Aaron James Callard, Ottawa (CA)

(72) Inventors: William Anthony Gage, Stittsville (CA); Aaron James Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 15/981,197

(22) Filed: May 16, 2018

(65) Prior Publication Data
US 2018/0352482 A1    Dec. 6, 2018

Related U.S. Application Data

(60) Provisional application No. 62/513,640, filed on Jun. 1, 2017.

(51) Int. Cl.
| | |
|---|---|
| H04W 36/00 | (2009.01) |
| H04W 88/16 | (2009.01) |
| H04W 60/04 | (2009.01) |
| H04W 92/04 | (2009.01) |
| H04W 36/18 | (2009.01) |

(52) U.S. Cl.
CPC ........ *H04W 36/0011* (2013.01); *H04W 60/04* (2013.01); *H04W 88/16* (2013.01); *H04W 36/18* (2013.01); *H04W 92/045* (2013.01)

(58) Field of Classification Search
None
See application file for complete search history.

(56) References Cited

U.S. PATENT DOCUMENTS

| | | | |
|---|---|---|---|
| 10,390,181 B2 * | 8/2019 | Shimizu | ............... H04W 88/16 |
| 2005/0122900 A1 * | 6/2005 | Tuulos | ............... H04L 41/0893 |
| | | | 370/229 |

(Continued)

FOREIGN PATENT DOCUMENTS

| | | | |
|---|---|---|---|
| CN | 102523570 A | 6/2012 | |
| CN | 103636283 A | 3/2014 | |
| WO | WO-2018072059 A1 * | 4/2018 | ............ H04W 76/15 |

OTHER PUBLICATIONS

3GPP TR 23.799 V14.0.0 (Dec. 2016) "Study on Architecture for Next Generation System".

(Continued)

*Primary Examiner* — Chi H Pham
*Assistant Examiner* — Vladislav Y Agureyev

(57) ABSTRACT

A Radio Access Network Node (RANN) for managing communications in a public land mobile network (PLMN). The RANN comprises a plurality of RANN function entities configured to be instantiated in at least two geographically dispersed locations of the public land mobile network (PLMN), and further configured to communicate with each other to implement the functions of the RANN; and one or more interface end points configured to exchange control plane and user plane messages between the RANN and other entities of the PLMN, each interface end point being associated with at least one RANN function entity.

20 Claims, 27 Drawing Sheets

(56) References Cited

U.S. PATENT DOCUMENTS

| | | | |
|---|---|---|---|
| 2012/0039472 A1* | 2/2012 | Liu | H04W 12/04 |
| | | | 380/270 |
| 2015/0110095 A1* | 4/2015 | Tan | H04W 40/02 |
| | | | 370/338 |
| 2015/0365790 A1* | 12/2015 | Edge | H04W 4/90 |
| | | | 455/404.2 |
| 2016/0142321 A1* | 5/2016 | Gage | H04W 4/70 |
| | | | 370/235 |
| 2016/0174285 A1* | 6/2016 | Ke | H04W 8/06 |
| | | | 370/329 |
| 2017/0126618 A1 | 5/2017 | Bhaskaran et al. | |
| 2017/0208634 A1* | 7/2017 | Bharatia | H04W 72/0406 |
| 2017/0265189 A1* | 9/2017 | Stephenne | H04W 72/082 |
| 2017/0332192 A1* | 11/2017 | Edge | H04W 64/00 |
| 2017/0339609 A1* | 11/2017 | Youn | H04W 76/11 |
| 2017/0359768 A1* | 12/2017 | Byun | H04W 8/06 |
| 2018/0042057 A1* | 2/2018 | Johansson | H04W 76/10 |
| 2018/0077682 A1* | 3/2018 | Li | H04W 52/0222 |
| 2018/0115928 A1* | 4/2018 | Kim | H04W 36/0061 |
| 2018/0192337 A1* | 7/2018 | Ryu | H04W 36/0066 |
| 2018/0249317 A1* | 8/2018 | Kurasugi | H04W 8/18 |
| 2018/0270888 A1* | 9/2018 | Faccin | H04W 76/15 |
| 2018/0278357 A1* | 9/2018 | Kim | H04J 11/0076 |
| 2019/0007984 A1* | 1/2019 | Kuroda | H04W 64/00 |
| 2019/0098545 A1* | 3/2019 | Zhang | H04W 36/22 |
| 2019/0150219 A1* | 5/2019 | Wang | H04W 76/19 |
| 2019/0150225 A1* | 5/2019 | Mohamed | H04W 76/10 |
| | | | 370/329 |
| 2019/0174571 A1* | 6/2019 | Deenoo | H04W 76/28 |
| 2019/0191343 A1* | 6/2019 | Iwai | H04W 80/10 |
| 2019/0208465 A1* | 7/2019 | Mihaly | H04W 8/26 |
| 2019/0223093 A1* | 7/2019 | Watfa | H04W 36/24 |
| 2019/0230520 A1* | 7/2019 | Wei | H04W 36/00835 |
| 2019/0246342 A1* | 8/2019 | Wang | H04W 8/00 |

OTHER PUBLICATIONS

3GPP TR 38.801 V14.0.0 (Mar. 2017) "Study on new radio access technology; Radio access architecture and interfaces".

3GPP TR 38.804 V14.0.0 (Mar. 2017) "Study on New Radio Access Technology; Radio Interface Protocol Aspects".

* cited by examiner

GEOGRAPHIC DISPERSION OF RADIO ACCESS NETWORK (RAN) NODE FUNCTIONS

CROSS REFERENCE TO RELATED APPLICATIONS

This application is based on, and claims benefit of, U.S. provisional patent application No. 62/513,640 filed Jun. 1, 2017, the entire content of which is incorporated herein by reference.

FIELD OF THE INVENTION

The present invention pertains to the field of communications networks, and in particular to geographic dispersion of radio access network (RAN) node functions within a wireless communications network.

BACKGROUND

Different mobile network operators may have different network design objectives that they wish to meet through either the centralisation or the distribution of RAN functions. For example:
  locating radio link cryptographic operations in a central data centre allows encryption used over a radio link to be exploited to also provide secrecy over a backhaul network. This may obviate the need for secondary encryption mechanisms in the backhaul network and eliminate the need for separate security gateways, thus reducing network deployments costs.
  locating user traffic processing operations close to a cell site enables forwarding of data to local Internet gateways and to mobile edge computing functions. This may provide lower latency and/or lower backhaul costs.
  locating all cryptographic functions in a central data centre may enhance network security and reduce the requirements for secured cell sites.
  locating non-real time control plane functions in central data centre may enable use of network function virtualisation for these functions which may lower costs and provide greater scalability.

A wireless user device may initiate one or more data sessions where different data sessions may have different service requirements. The user plane entities responsible for different sessions may need to be instantiated in different locations within the public land mobile network (PLMN) in order to meet the service requirements of their associated session. Similarly, control plane entities for different wireless user devices or for different sessions may be instantiated in locations within the RAN that are different from the locations chosen for user plane entities.

In addition, user plane entities responsible for uplink traffic may be instantiated in locations different from user plane entities responsible for downlink traffic. For example, user plane uplink traffic entities may be located close to a cell site for connection to local Internet gateways while user plane downlink traffic entities may be located centrally, close to a mobility anchor point.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide systems and methods for geographic dispersion of radio access network (RAN) node functions.

Accordingly, an aspect of the present invention provides a radio access network node (RANN) entity for managing communications in a public land mobile network (PLMN). The RANN entity comprises a plurality of RANN function entities configured to be instantiated in at least two geographically dispersed locations within the PLMN, and further configured to communicate with each other to implement the functions of the RANN entity; and one or more interface end points configured to exchange control plane and user plane messages between the RANN entity and other entities of the PLMN, each interface end point being associated with at least one RANN function entity. Further, the location for different RANN function entities may be determined dynamically and may be different for different services, for different data sessions, and/or for different mobile network operator deployments.

BRIEF DESCRIPTION OF THE FIGURES

Further features and advantages of the present invention will become apparent from the following detailed description, taken in combination with the appended drawings, in which:

FIG. 11 is a block diagram illustrating example Deployment Scenario A;

FIG. 12 is a block diagram illustrating example Deployment Scenario B1;

FIG. 13 is a block diagram illustrating example Deployment Scenario B2;

FIG. 14 is a block diagram illustrating example Deployment Scenario C1;

FIG. 15 is a block diagram illustrating example Deployment Scenario C2;

FIG. 16 is a block diagram illustrating example Deployment Scenario D;

FIG. 17 is a block diagram illustrating example Deployment Scenario E;

FIG. 18 is a block diagram illustrating example Deployment Scenario F;

It will be noted that throughout the appended drawings, like features are identified by like reference numerals.

DETAILED DESCRIPTION

Figure 1:
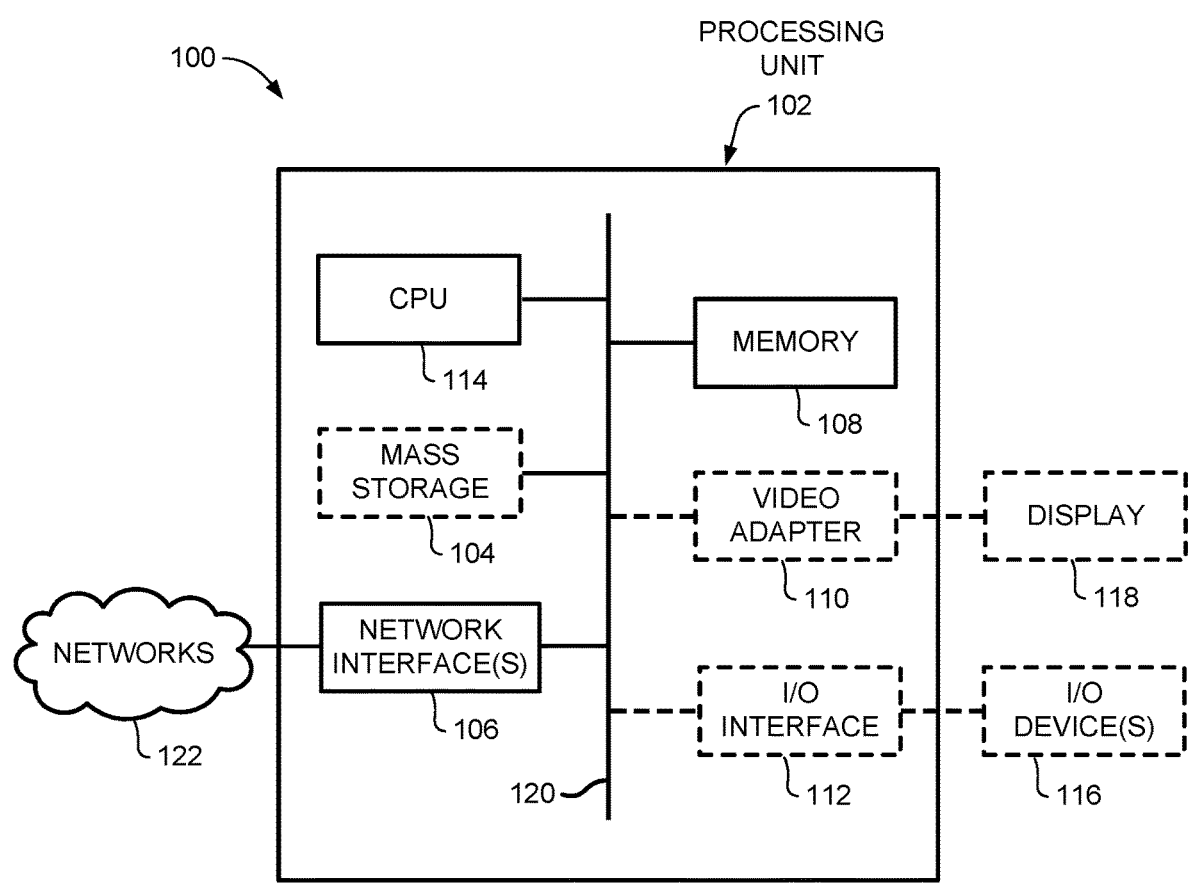
FIG. 1 is a block diagram of a computing system 100 that may be used for implementing devices and methods in accordance with representative embodiments of the present invention.

FIG. 1 is a block diagram of a computing system 100 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 100 includes a processing unit 102. The processing unit 102 typically includes a central processing unit (CPU) 114, a bus 120 and a memory 108, and may optionally also include a mass storage device 104, a video adapter 110, and an I/O interface 112 (shown in dashed lines).

The CPU 114 may comprise any type of electronic data processor. The memory 108 may comprise any type of non-transitory system memory such as static random access memory (SRAM), dynamic random access memory (DRAM), synchronous DRAM (SDRAM), read-only memory (ROM), or a combination thereof. In an embodiment, the memory 108 may include ROM for use at boot-up, and DRAM for program and data storage for use while executing programs. The bus 120 may be one or more of any type of several bus architectures including a memory bus or memory controller, a peripheral bus, or a video bus.

The mass storage 104 may comprise any type of non-transitory storage device configured to store data, programs, and other information and to make the data, programs, and other information accessible via the bus 120. The mass storage 104 may comprise, for example, one or more of a solid state drive, hard disk drive, a magnetic disk drive, or an optical disk drive.

The video adapter 110 and the I/O interface 112 provide optional interfaces to couple external input and output devices to the processing unit 102. Examples of input and output devices include a display 118 coupled to the video adapter 110 and an I/O device 116 such as a touch-screen coupled to the I/O interface 112. Other devices may be coupled to the processing unit 102, and additional or fewer interfaces may be utilized. For example, a serial interface such as Universal Serial Bus (USB) (not shown) may be used to provide an interface for an external device.

The processing unit 102 may also include one or more network interfaces 106, which may comprise wired links, such as an Ethernet cable, and/or wireless links to access one or more networks 122. The network interfaces 106 allow the processing unit 102 to communicate with remote entities via the networks 122. For example, the network interfaces 106 may provide wireless communication via one or more transmitters/transmit antennas and one or more receivers/receive antennas. In an embodiment, the processing unit 102 is coupled to a local-area network or a wide-area network for data processing and communications with remote devices, such as other processing units, the Internet, or remote storage facilities.

Figure 2:
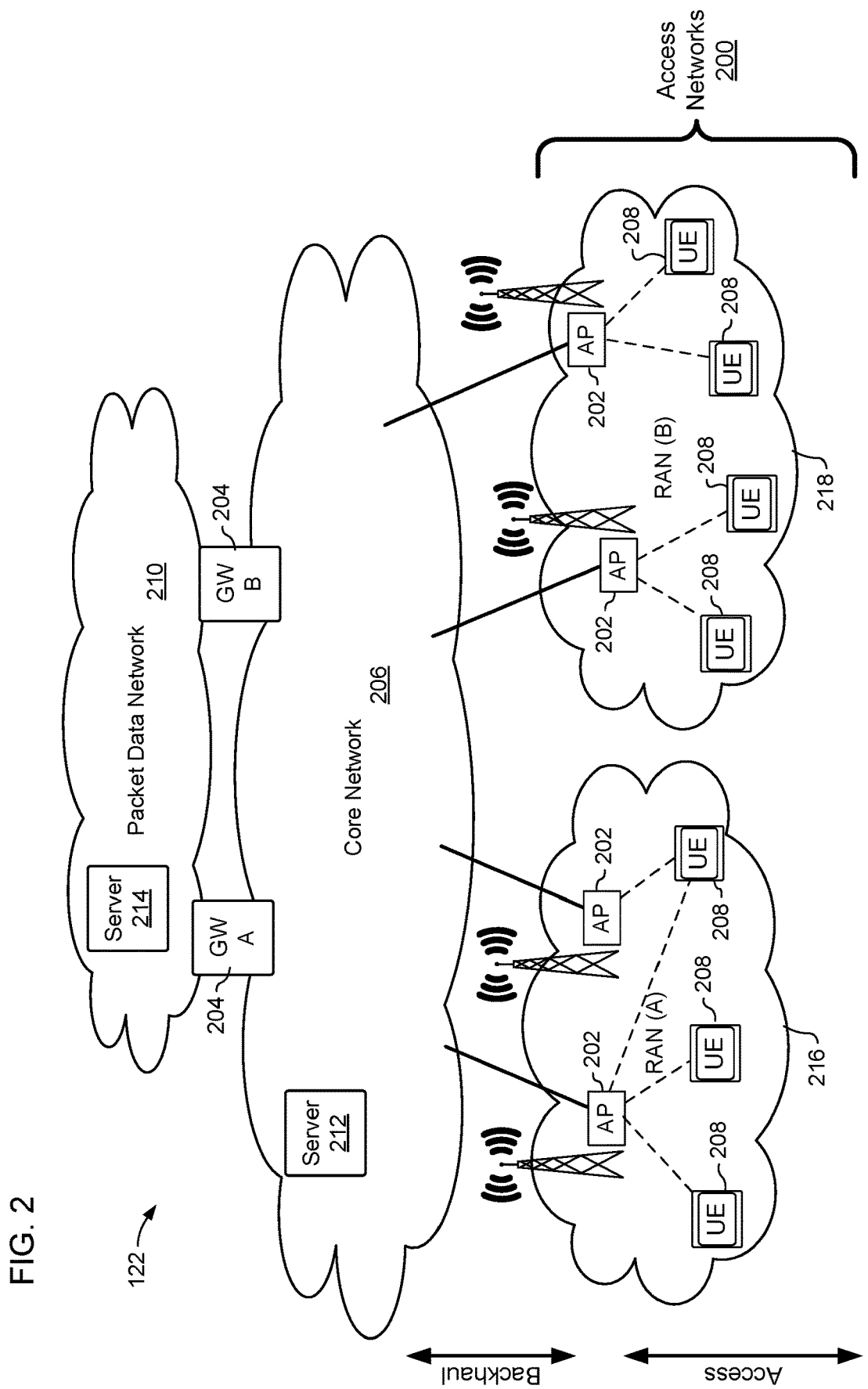
FIG. 2 is a block diagram schematically illustrating an architecture of a representative network usable in embodiments of the present invention.

FIG. 2 is a block diagram schematically illustrating an architecture of a representative network 122 in which embodiments of the present invention may be deployed. The network 122, may be a Public Land Mobility Network (PLMN) comprising a Radio Access Network 200, and a core network 206 through which wireless user devices such as User Equipment (UE) 208 may access a packet data network 210. PLMN 122 may be configured to provide connectivity between User Equipment (UE) 208 such as mobile communication devices, and servicers such as server 212 or 214 which can be in core network 206 and packet data network 210 respectively. Thus, network 122 may enable end-to-end communications services. As may be seen in FIG. 2, the RAN 200 comprises a plurality of radio Access Points (APs) 202 that are connected to one or more Packet Data Network Gateways (GWs) 204 through the core network 206. In the 4G communications standard, an AP 202 may also be referred to as an evolved Node-B (eNodeB, or eNB), while in the 5G communications standard, an AP may also be referred to as a gNB. In this disclosure, the terms Access Point (AP), evolved Node-B (eNB), eNodeB and gNB will be treated as being synonymous, and may be used interchangeably. In the 4G communications standard, the gateway 204 may be a packet gateway (PGW), and in some embodiments one of the gateways 204 could be a serving gateway (SGW). In the 5G communications standard, the gateway 204 may be a user plane gateway (UPGW) or some other user plane function (UPF).

The APs 202 typically include radio transceiver equipment for maintaining wireless connections with the UEs 208, and one or more interfaces for transmitting data or signalling through the core network 206 to the GWs 204. Each GW 204 provides a link between the core network 206 and the packet data network 210, and so enables traffic flows between the packet data network 210 and UEs 208. It is common to refer to the connections between the APs and the UEs (along with the nodes themselves) as the Radio Access Network 200, while the nodes and functions hosted on server 212 and other like it are referred to as the core network 206. Links between the APs 202 and the core network 206 are known as the "backhaul" network which may be composed of both wired and wireless links. In some embodiments (not shown) connections between the AP and an associated antenna, which may or may not be co-located, are referred to as fronthaul connections.

Typically, traffic flows to and from UEs 208 are associated with specific services of the packet data network 210 and/or the core network 206. As is known in the art, a service of the packet data network 210 will typically involve either one or both of a downlink traffic flow from one or more servers 214 in the packet data network 210 to a UE 208 via one or more of the GWs 204, and an uplink traffic flow from the UE 208 to one or more of the servers in the packet data network 210, via one or more of the GWs 204. Similarly, a service of the core network 206 will involve either one or more of a downlink traffic flow from one or more servers 212 of the wired network 206 to a UE 208, and an uplink traffic flow from the UE 208 to one or more the servers 212. In both cases, optimization of the uplink traffic flows involves optimization of both the wireless link between the UE 208 and one or more host APs 202, and the wired links through the core network 206 from the host APs 202 to the involved GWs 204 or servers 212 of the core network 206.

This disclosure defines mechanisms for geographically dispersing radio access network (RAN) node functions within a PLMN. The dispersion of RAN node functions follows a dual-connectivity protocol stack model similar to that of LTE by separating higher-layer entities of the protocol stack from lower-layer entities of the protocol stack and by distinguishing control plane functions from user plane functions. As a result, functions related to a particular UE or to a particular session associated with a UE may be optimally placed at either centralised or distributed locations within the service area. For the purposes of the following description, a RAN node may comprise an Access Point, Base Station, Node-B, evolved Node-B (eNB), next generation Node-B (gNB), a centralised unit (CU), a distributed unit (DU), and other forms of radio access controller.

Figure 3B:
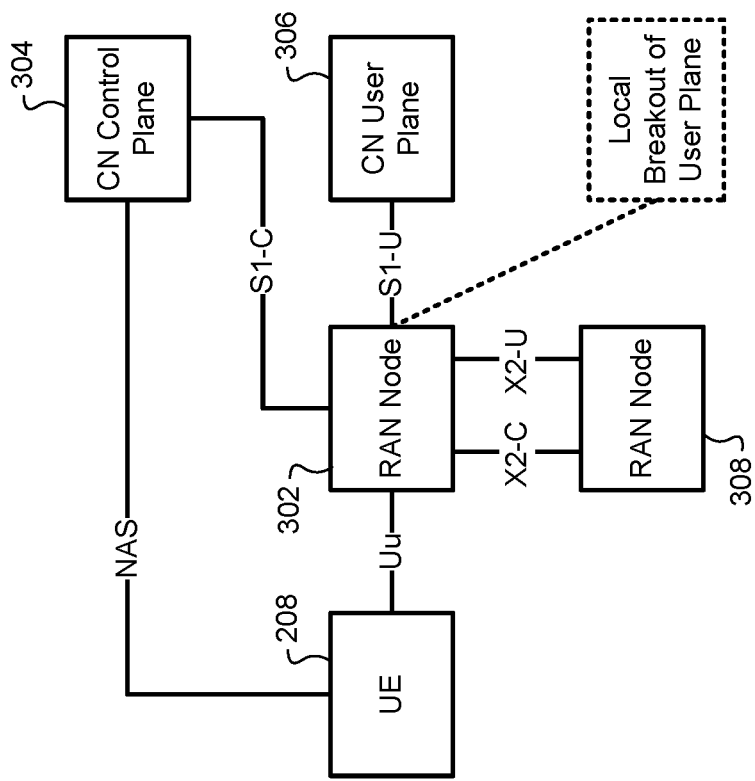
FIG. 3B is a block diagram of a RAN Reference System Architecture for LTE.
Figure 3A:
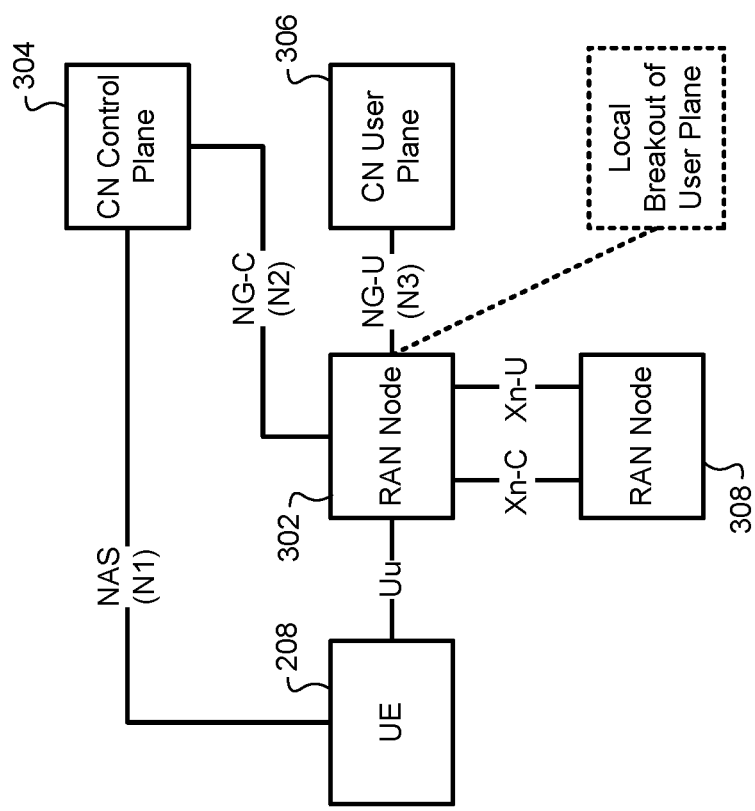
FIG. 3A is a block diagram of a RAN Reference System Architecture for 5G.

As illustrated in FIG. 3A, a radio access network (RAN) node 302 in a 5G system may be connected to a core network (CN) control plane entity 304 through an interface referred to as NG-C (or N2) and to a CN user plane entity 306 through an interface referred to as NG-U (or N3). The CN control plane entity 304 is also connected to user equipment (UE) 208 through an interface referred to as N1; the N1 control plane messages are conveyed through the RAN node 302 as Non-Access Stratum (NAS) signalling.

A RAN node 302 may also be connected to the user equipment (UE) 208 via a radio link (Uu) and to other RAN nodes 308 via an interface referred to as Xn that includes both a control plane component (Xn-C) and a user plane component (Xn-U).

A UE 208 may establish multiple PDU sessions with the CN 206 where different sessions may correspond to different instances of the NG-U user plane interface; each instance of the NG-U interface may terminate on a different CN user plane entity 306. In some instances, local breakout of session traffic may be provided by the RAN node (e.g. for direct routing to the Internet or to mobile edge computing functions). Regardless of the number of PDU sessions established for (or by) a UE 208, there may only be one instance of the NAS (N1) interface and one instance of the NG-C (N2) interface associated with that UE 208.

In an LTE system illustrated in FIG. 3B, similar interfaces may exist. Thus, a RAN node 302 may be connected to a CN 206 through an S1 interface and to other RAN nodes 308 through an X2 interface.

Figure 4:
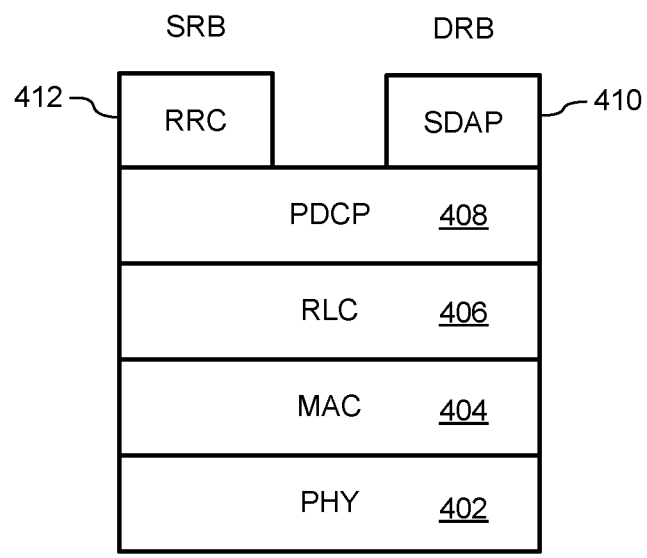
FIG. 4 is a block diagram illustrating a Radio Link Protocol Stack.

Referring to FIG. 4, the Uu interface between a UE 208 and a RAN node 302 may comprise several entities within the protocol stack. Example entities include:
physical layer (PHY) 402—which encodes information for transmission over the radio link.
medium access control (MAC) 404—which performs scheduling of radio resources according to traffic demands, multiplexing of MAC PDUs belonging to one or different logical channels onto PHY transport blocks, and error correction through Hybrid Automatic Repeat Requests (HARQ).
radio link control (RLC) 406—which performs segmentation and reassembly of RLC protocol data units (PDUs) for mapping onto PHY transport blocks, and provides error recovery through automatic repeat requests (ARQ).
packet data convergence protocol (PDCP) 408—which performs header compression and decompression for IP packets, in-sequence delivery of upper layer PDUs, PDCP PDU routing for transmission, duplicate packet detection, retransmission of lost PDCP PDUs, cryptographic integrity protection and encryption.
service data adaptation protocol (SDAP) 410—which performs routing of QoS flows onto the appropriate data radio bearer. A QoS flow may comprise an aggregation of user plane traffic receiving the same forwarding treatment (e.g. scheduling policy, queue management policy, rate shaping policy, RLC configuration, PDCP configuration). Providing different QoS forwarding treatment requires a different QoS flow.
radio resource control (RRC) 412 performs configuration of radio resources assigned to a UE 208, configuration of radio bearers for information exchange, management of radio link security associations, paging, measurement reporting, handover, and transport for non-access stratum signalling.

Control plane information such as RRC and NAS signalling may be carried over a signalling radio bearer (SRB) while user plane data may be carried over a data radio bearer (DRB).

Figure 5:
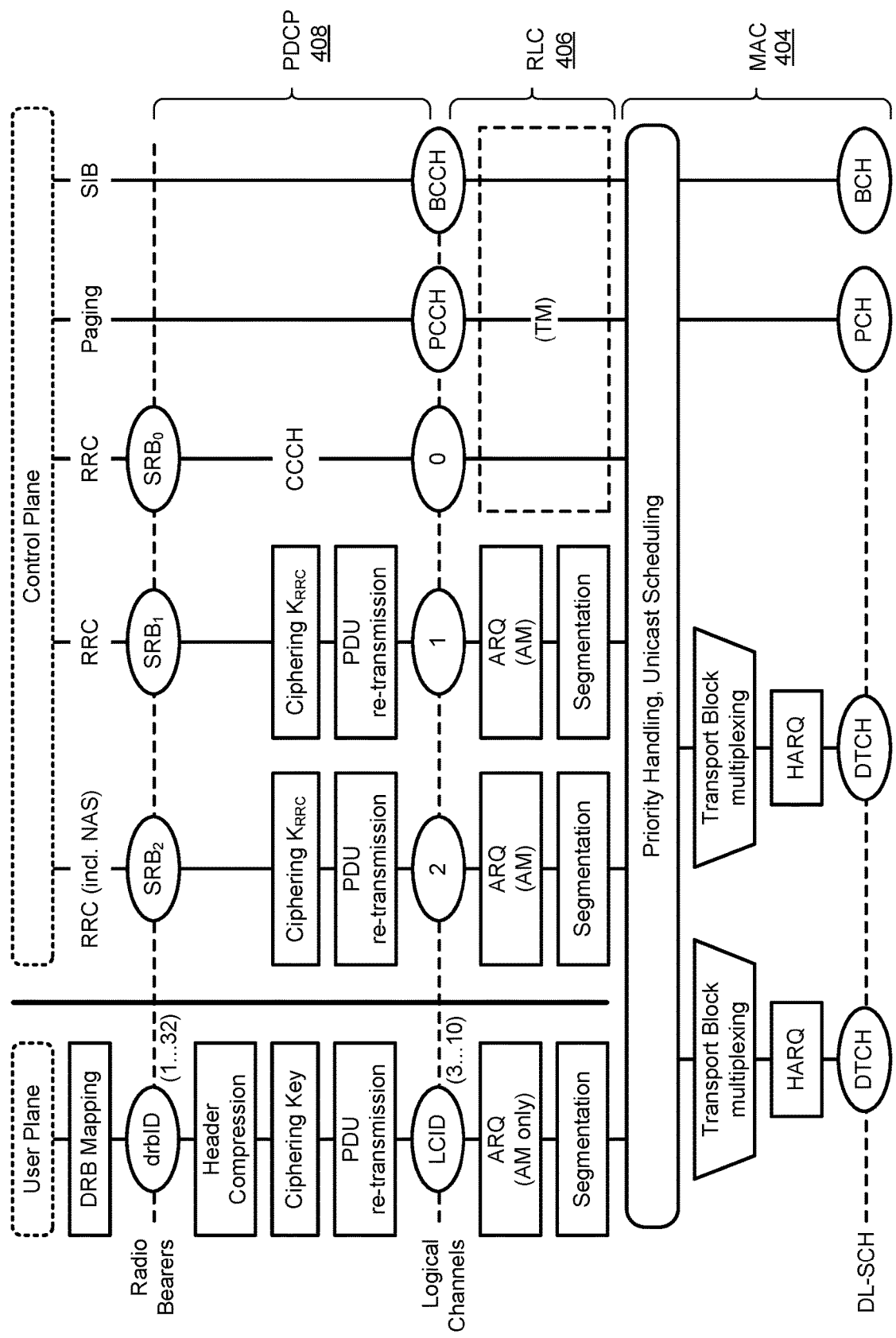
FIG. 5 is a block diagram illustrating a Radio Link Protocol Architecture.

FIG. 5 is a block diagram illustrating a radio link protocol which may be used over the Uu interface. In this architecture, radio bearers at the PDCP layer 408 are mapped onto logical channels at the RLC layer 406. The logical channels are multiplexed into transport blocks and mapped onto PHY layer resources by the MAC layer 404.

A signalling radio bearer (SRB) conveys control information between a UE and the RAN. The standard SRBs include:
SRB0—which is used for an initial exchange of control messages before the establishment of a security association between a UE 208 and the RAN and before the configuration of protocol stack entities. As a result, SRB0 is restricted to the exchange of short messages that are neither authenticated nor encrypted.
SRB1—which is used for the exchange of high priority radio resource control signalling after the establishment of a security association between a UE and the RAN. As a result, all information exchanged over SRB1 is encrypted and authenticated. The RLC entity associated with SRB1 is configured to provide segmentation and reassembly, allowing large messages to be exchanged over the radio, and to provide assured mode (AM) delivery of messages through the use of automatic repeat requests (ARQ) to recover lost messages.
SRB2—which is used for the exchange of low priority radio resource control signalling (such as measurement information) and for conveying NAS signalling between the UE and the CN. Like SRB1, all information exchanged over SRB1 is encrypted and authenticated and RLC is configured to provide segmentation and reassembly and ARQ for assured mode delivery.

As with SRB0, Paging Common Control Channels (PCCH) and Broadcast Common Control Channels (BCCH) for the broadcast of system information may be transmitted in a transparent mode (TM) without encryption, integrity protection or segmentation.

A data radio bearer (DRB) may convey user plane information between a UE and the RAN. A UE 208 may be configured with one or more DRBs according to the QoS requirements of the user plane traffic. In particular, each DRB may be configured to optionally perform one or more of: IP packet header compression, encryption and/or assured delivery of user plane packets; segmentation and re-assembly is always provided for user plane traffic.

A UE 208 may establish multiple PDU sessions with the CN; each PDU session will have its own set of DRBs to ensure that traffic associated with one session does not adversely affect traffic associated with another session. Regardless of the number of PDU sessions established for a UE 208, there is only one instance of each control plane SRB associated with that UE 208.

If ciphering (i.e. encryption and/or integrity protection) is enabled for a DRB, the user plane cryptographic keys (e.g. $K_{UP\text{-}ENC}$ and $K_{UP\text{-}INT}$) may be distinct from the control plane cryptographic keys (e.g. $K_{RRC\text{-}ENC}$ and $K_{RRC\text{-}INT}$) used for ciphering.

In some networks, a number of small cells may be deployed within the coverage area of a macro cell to offload traffic from the macro cell and/or to provide improved signal quality to UEs. FIG. 6A shows an example deployment in which a master RAN node 302A provides the NG connections to the core network and maintains a signalling radio bearer (SRB) to a UE 208 through a primary cell. The UE 208 may use a data radio bearer (DRB) to convey user plane traffic through a secondary cell to a secondary RAN node 302B. This traffic may be relayed between the master and the secondary RAN nodes (302A and 302B) over an Xn interface.

Figure 6B:
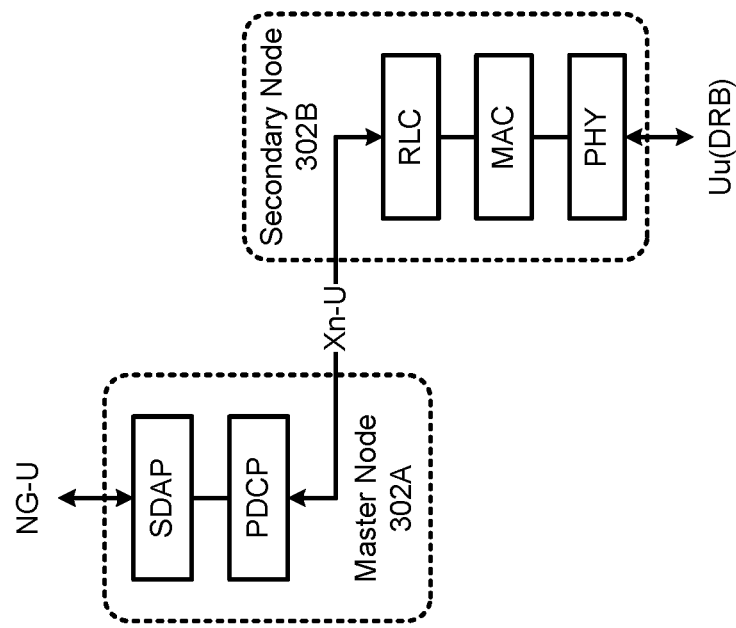
FIG. 6B is a block diagram illustrating a Protocol Stack for the Dual Connectivity of FIG. 6A.
Figure 6A:
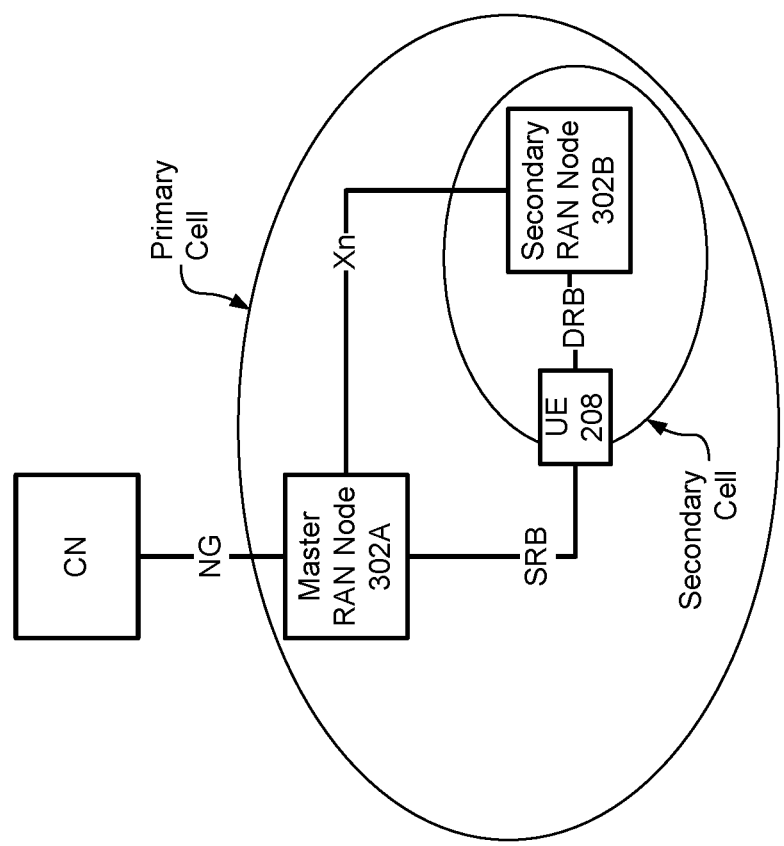
FIG. 6A is a block diagram illustrating Dual Connectivity.

On the network side, the user plane protocol stack in a dual connectivity deployment may be split between the master RAN node 302A and the secondary RAN node 302B, as may be seen in FIG. 6B. The master RAN node 302A houses the upper layer protocol stack entities (including SDAP and PDCP) while the secondary RAN node 302B houses the lower layer protocol stack entities (RLC, MAC and PHY).

While the UE 208 is registered with the network, it may transition between multiple RAN states, including:

connected state. In this state, the UE 208 maintains radio bearers with the RAN in order to exchange user plane data with servers connected to the Internet-at-large.

idle state. In this state, the UE 208 may remain registered with the CN but there are no RAN resources associated with the UE 208. As a result, the UE 208 is not known to the RAN and cannot transmit or receive information while in this state.

inactive state. In this state, there are no radio resources associated with the UE 208 but the RAN maintains a context for the UE 208 that encompasses the security keys established during authentication of the UE 208 and the configuration parameters associated with all sessions that have been established for the UE 208. Inactive state allows a UE 208 to enter a low energy mode of operation, similar to idle state, in order to conserve battery power but allows a quick transition to connected state in order to transmit and receive information.

In modern networks, different mobile network operators may have different network design objectives that they wish to meet through either the centralisation or the distribution of RAN functions. For example:

locating PDCP user plane operations in a central data centre may allow PDCP encryption to be exploited to provide security over the backhaul. This may obviate the need for IPsec in the backhaul and eliminate the need for separate security gateways, thus reducing network deployment costs.

locating PDCP user plane operations close to a cell site may enable local traffic breakout and mobile edge computing functions. This may provide lower latency and/or lower backhaul costs.

locating all cryptographic functions in a central data centre may enhance network security and reduce the requirements for secured cell sites.

locating non-real time control plane functions in central data centre may enable use of network function virtualisation for these functions which may lower costs and provide greater scalability.

It may also be desirable to instantiate user plane entities for various PDU sessions in respective different locations within the RAN in order to meet the service requirements of each session. Similarly, control plane entities for different UEs or for different PDU sessions may be instantiated in various locations within the RAN.

In addition, it may be desirable to instantiate user plane entities for uplink traffic in different locations from user plane entities for downlink traffic. For example, user plane uplink traffic entities may be located close to a cell site for local breakout while user plane downlink traffic entities may be located centrally, close to a mobility anchor point.

In conventional networks, these diverse objectives may be met through a combination of monolithic RAN nodes in centralized and/or distributed deployments, and dual connectivity.

In a typical LTE deployment, each RAN node 302 is a monolithic entity that is located at a cell site (distributed deployment) and connected through a backhaul network to a centralised site housing, for example, core network and/or traffic aggregation functions. Such a deployment places all RAN functions at the cell site so that network optimisations requiring centralised RAN functions cannot be realised.

In a centralised RAN (C-RAN) deployment, most of the RAN functions are centrally located with only lower layer PHY functions located in radio heads at a cell site. In such a deployment, network optimisations requiring RAN functions to be co-located at or near a cell site cannot be realised.

The 3GPP dual-connectivity solution described above is designed to provide coverage enhancements in a distributed deployment of monolithic RAN nodes. Consequently, it suffers from the same problems as the distributed deployment of monolithic RAN nodes as described above.

The location of RAN functions is typically fixed by the product or network design so that all RAN functions are either located at a cell site or located at a central site. Therefore it is not possible to optimally place functions within the radio access network according to the service requirements of a particular PDU session.

In addition, existing RAN solutions do not make a distinction between control plane entities and user plane entities; as a result, control and user plane entities are typically co-located within the same network node.

This disclosure addresses these problems by providing mechanisms for geographically dispersing radio access network (RAN) node functions as opposed to RAN nodes as a whole. Thus the present disclosure provides a Radio Access Network Node (RANN) entity for managing communications in a Radio Access Network (RAN). The RANN entity comprises a plurality of RANN function entities configured to be instantiated in at least two geographically dispersed locations of the PLMN, and further configured to communicate with each other to implement the functions of the RANN entity; and one or more interface end points configured to exchange control plane and user plane messages between the RANN entity and other entities of the RAN, each interface end point being associated with at least one RANN function entity. The location for different RANN function entities may be determined dynamically and may be different for different services, for different UE sessions, and/or for different mobile network operator deployments.

The geographical dispersion of RAN node functions (or, equivalently, RANN function entities) separates higher-layer entities of the protocol stack from lower-layer entities of the protocol stack and distinguishes control plane functions from user plane functions. As a result, node functions related to a particular UE or to a particular session associated with a UE may be optimally instantiated in either centralised or distributed locations (servers) within the PLMN or a given service area within the RAN.

Figure 7:
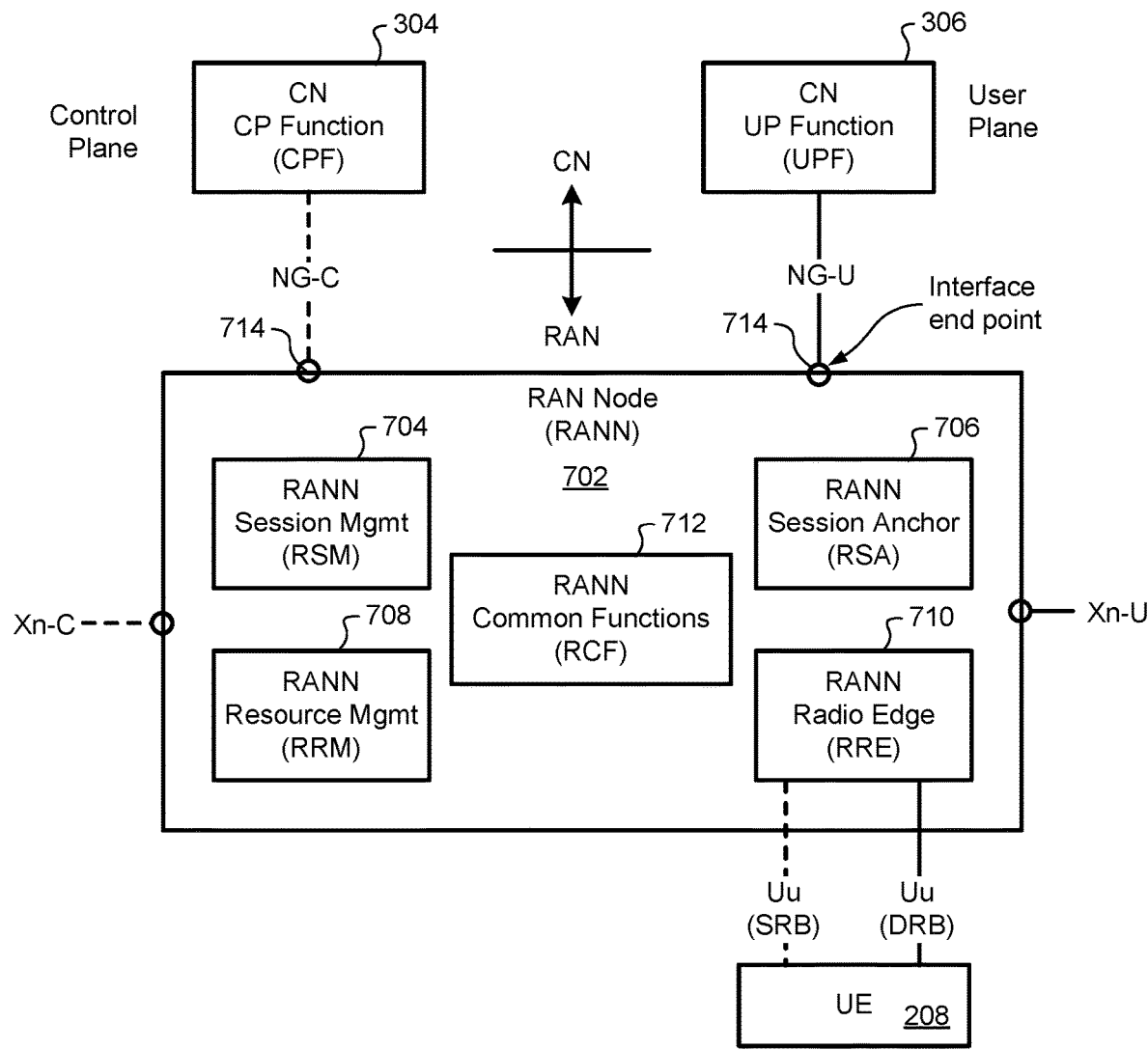
FIG. 7 is a block diagram illustrating a Functional Model for an example Geographically Dispersed RAN Node in accordance with an embodiment.

The solutions described in this disclosure build on the 3GPP dual-connectivity concepts described above with reference to FIGS. 6A and 6B for separating the user plane protocol stack into upper layer protocol stack functions (encompassing PDCP and SDAP) and lower layer protocol stack functions (encompassing RLC, MAC and PHY). In addition, a distinction is made between control plane entities related to radio resource management and those related to PDU session management. The resulting functional model of a RAN node (RANN) 702 is illustrated in FIG. 7 and described below:

- a RANN Session Management (RSM) control plane function 704 provides PDU session management for a particular UE 208.
- a RANN Session Anchor (RSA) user plane function 706 performs traffic steering between a RANN radio edge entity and a CN user plane function (UPF) 306 for a particular UE session.
- a RANN Resource Management (RRM) 708 control plane function assigns and configures RAN radio resources for UEs served by RANN radio edge entities within the scope of RAN node 702.
- a RANN Radio Edge (RRE) 710 is a transport function that performs transmission and reception of signals over a radio link related to both control and user plane traffic between a UE 208 and the RAN node 702.
- RANN Common Functions (RCF) 712 comprise control plane functions that may not be related to a specific UE 208 currently served by the RAN node 702; these functions may include, for example, paging, public warning system broadcasts, and system information broadcasts.

Other network entities may interact with the RAN node 702 through interface end points 714 that may be dynamically bound to functional entities within the RAN node 702 and signalled to the corresponding network entity. Interface end points may, for example, be identified through a transport layer address such as an Ethernet address or an IP address and socket port number. As a result, the internal composition of a RAN node 702 is not visible to the core network, to UEs or to other RAN nodes. This implies that the functional entites of a given RAN node 702 (e.g. the RSM 704, RSA 706, RRM 708, RRE 710 and RCF 712) may be geographically dispersed across multiple physical or virtual servers within the PLMN. For example, the RCF functional entity 712 of a particular RAN node 702 may be instantiated in a centralized server of the RAN 200 (or the Core Network 206, if desired), while the RRE 710 and RRM 708 functional entities of that particular RAN node 702 are instantiated in an Access Point 202 serving a particular cell of the RAN. The dynamic association of an interface end point 714 with an interface may also be used by the RAN node 702 to select the most appropriate geographic location for a particular instance of a functional entity.

Figure 8:
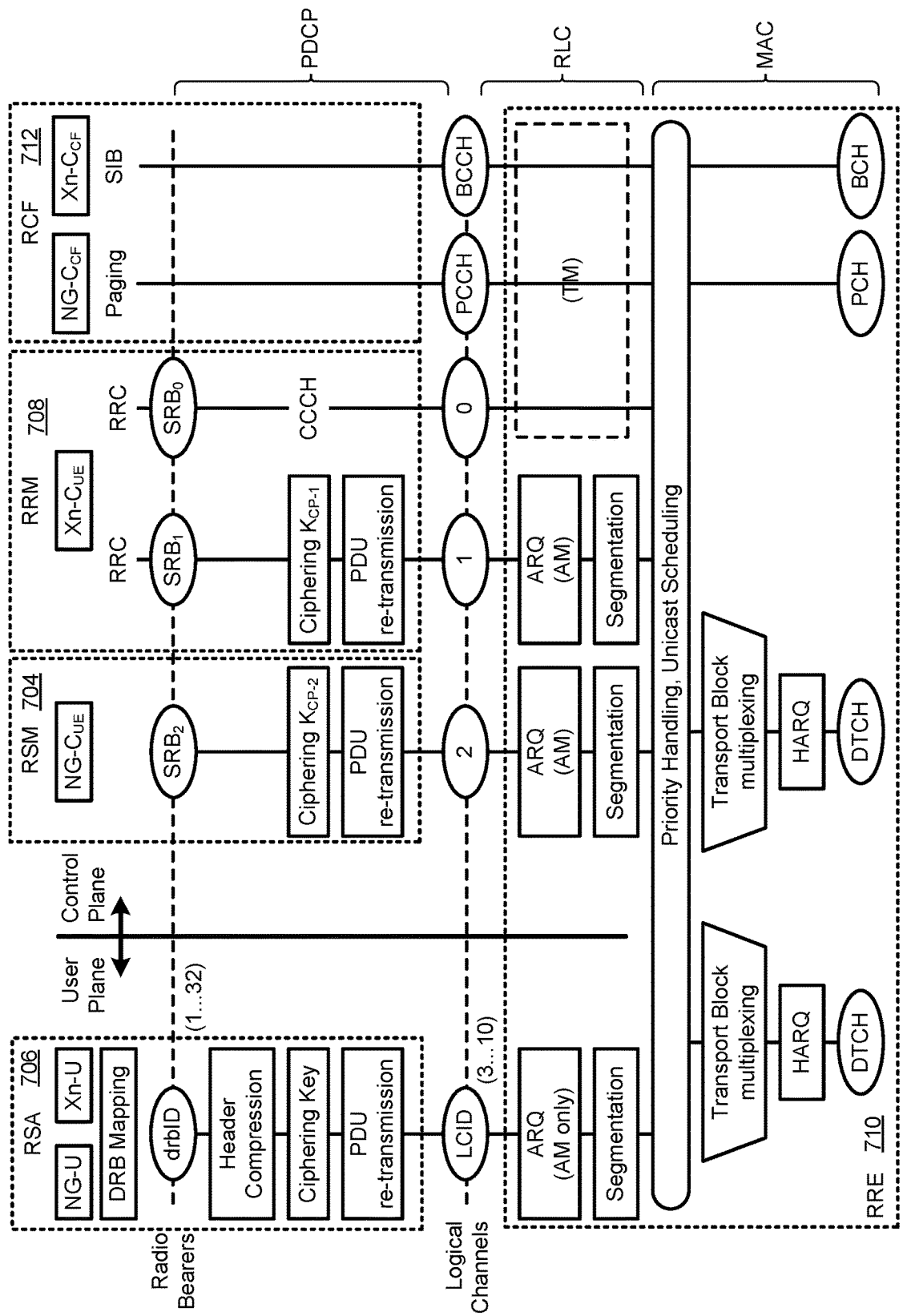
FIG. 8 is a block diagram illustrating RAN Node affiliations.

FIG. 8 illustrates how responsibility for different elements of the NG, Xn and Uu interfaces may be apportioned across the functional entities of a RAN node 702.

RANN Session Management (RSM)

A RANN Session Management (RSM) function 704 may handle the exchange of UE-specific signalling conveyed over the NG-C interface to the core network control plane function (CN CPF) associated with the UE. For each UE 208, there may be one RSM 704 within the RAN and one CPF 304 within the CN regardless of the number of sessions currently active for the UE 208.

As described in 3GPP Technical Report (TR) 23.799, "Study on Architecture for Next Generation System" (Dec. 30, 2015), a CN CPF 304 may be assigned to the UE 208 when the UE 208 initially registers with the network and may be released when the UE 208 registration is terminated. Note, however, that different instances of the CN CPF 304 may be associated with the UE 208 at different times throughout its active registration period.

An RSM 704 may be assigned to the UE 208 when the UE 208 transitions from a RAN idle state to a RAN connected state. The RSM 704 may be assigned to the UE 208 while it remains in a RAN connected state within the coverage area of the RAN node 702. If a mobile UE 208 performs a handover to a cell within the coverage area of a different RAN node, session management may be transferred to an RSM 704 within the new serving RAN node 702.

If the UE 208 transitions from a RAN connected state to a RAN inactive state, the RSM 704 currently associated with the UE 208 may continue to maintain the UE 208 context even if the UE 208 roams into the coverage area of a different RAN node 702. When the UE 208 transitions from the RAN inactive state to a RAN connected state, session management may be transferred to an RSM 704 associated with the new serving RAN node 702.

Non-Access Stratum (NAS) signalling between the UE 208 and the CN CPF 304 may also be relayed through the RSM 704. Over the radio link, NAS signalling is transmitted over SRB2 with the RANN radio edge (RRE 710) relaying the SRB2 traffic between the UE 208 and the RSM 704.

In some embodiments, RSM 704 may incorporate the PDCP entity 408 responsible for SRB2 ciphering (integrity protection and encryption) and for SRB2 PDU loss recovery through retransmission. In other embodiments, messages carried between a UE 208 and RSM 704 over SRB2 may be relayed through an SRB2 PDCP entity 408 that is co-located with a RANN resource management (RRM) function.

RANN Session Anchor (RSA)

The RANN Session Anchor (RSA) function 706 may handle the exchange of session-specific user plane traffic conveyed over an NG-U interface to the core network user plane function (CN UPF) 306 associated with the PDU session. Different PDU sessions may be associated with different CN UPFs 306 and with different RSAs 706.

As described in 3GPP Technical Report (TR) 23.799, "Study on Architecture for Next Generation System" (Dec. 30, 2015), a CN UPF 306 may be assigned to the UE 208 PDU session when the session is established and is released when the session is terminated. Note, however, that different instances of the CN UPF 306 may be associated with the PDU session at different times throughout the session lifetime.

Similarly, an RSA 706 may be assigned to the UE PDU session when the session is established and is released when the session is terminated. The RSA 706 is associated with the PDU session while the UE 208 remains in a RAN connected state within the coverage area of the RAN node 702. If a mobile UE 208 performs a handover to a cell within the coverage area of a different RAN node, the user plane session anchor may be transferred to an RSA 706 associated with the new serving RAN node 702.

If a mobile UE 208 performs a handover to a cell within the coverage area of the same or of a different RAN node 702, the RSA 706 may support a make-before-break handover procedure by replicating and forwarding downlink PDUs to the serving and target cells, and for discarding any duplicated uplink PDUs received via the serving and target cells. Similar operations for replicated PDUs may be performed by an RSA 706 in support of highly reliable communications through multiple radio link channels.

If the UE 208 transitions from a RAN connected state to a RAN inactive state, the RSA 706 currently associated with a PDU session may continue to maintain the session with the corresponding CN UPF 306 even if the UE 208 roams into the coverage area of a different RAN node 702. If downlink PDUs destined for the UE 208 is received by the RSA 706, the RSA 706 may buffer the PDUs and initiate a paging procedure to deliver the PDUs to the UE 208.

When the UE 208 transitions from the RAN inactive state to a RAN connected state, the user plane session anchor may be transferred to an RSA 706 associated with the new serving RAN node 702.

Each PDU session may be associated with one or more DRBs according to the quality of service profile configured for each of the QoS flows associated with the session. RSM 704 configures RSA 706 to steer downlink PDUs onto the appropriate DRB according to the QoS flow identifier attached to each PDU. RSA 706 also incorporates the PDCP entities 408 responsible for DRB header compression, for ciphering (encryption and, optionally, integrity protection) and for PDU loss recovery through retransmission.

RANN Resource Management (RRM)

The RANN Resource Management (RRM) function 708 may handle allocation of radio resources to a UE 208 and the exchange of Uu control plane messages with a UE 208. An RRM 708 may be associated with the UE 208 when the UE 208 transitions from a RAN idle state to a connected state.

The RRM 708 is responsible for the UE 208 while it remains in a RAN connected state within the coverage area of the RAN node 702. If a mobile UE 208 performs a handover to a cell within the coverage area of a different RAN node, resource management may be transferred to an RRM 708 associated with the new serving RAN node 702. If the UE 208 transitions from a RAN connected state to a RAN inactive state, the RRM 708 is disassociated from the UE 208.

Radio Resource Control (RRC) signalling between the UE 208 and the RAN node 702 may be handled by, or relayed through, the RRM 708. Over the radio link, RRC signalling for initial access may be carried over SRB0 with subsequent RRC signalling carried over SRB1. RRM 708 also incorporates the PDCP entity 408 responsible for SRB1 ciphering (integrity protection and encryption) and for SRB1 PDU loss recovery through retransmission. In some embodiments, the PDCP entity 408 responsible for SRB2 ciphering and PDU loss recovery is also co-located with RRM 708.

RANN Radio Edge (RRE)

The RANN Radio Edge (RRE) function 710 handles the transport of control and user plane information over the radio link between a UE 208 and the RAN node 702. When a UE 208 is in the RAN connected state within the coverage area of a RAN node 702, RRM 708 establishes a logical channel and a corresponding radio link control (RLC) entity within the RRE 710 for each SRB and DRB associated with the UE 208. Each RLC entity 406 performs segmentation and re-assembly of PDUs transmitted over the corresponding logical channel and performs retransmission of lost PDU segments.

The RRE 710 may also perform the mapping of PDU (or PDU segments) onto physical layer (PHY) transport blocks provided to a UE 208 by the Medium Access Control (MAC) layer 404.

Cryptographic Keys

Cryptographic keys derived for use in the control plane may be different from the cryptographic keys derived for use in the user plane. In some embodiments, only one cryptographic key (e.g. $K_{CP}$) is derived for use in the control plane; its role may be similar to that of $K_{RRC}$ used in LTE. In other embodiments, two cryptographic keys may be derived for use in the control plane—one for use by RRM 708 (e.g. $K_{CP-1}$) and one for use by RSM 704 (e.g. $K_{CP-2}$).

Unlike LTE where only one cryptographic key is derived for use in the user plane, a different user plane cryptographic key may be derived for each session (e.g. $K_{UP-[S]}$, where [S] is a session identifier). This allows different keys to be associated with different RSAs 706 which, in turn, provides independence of each RSA 706 and allows RSAs for different sessions to be instantiated in different locations. It also allows different cryptographic algorithms to be chosen for different sessions; for example, encryption may be disabled for some sessions (e.g. for local break-out of Internet traffic) but not for others.

In some embodiments, each cryptographic key may be used for both encryption and integrity protection; the initialisation vector for encryption may be different from the initialisation vector used for integrity protection. In other embodiments, each cryptographic key may be used to derive an encryption key and a separate integrity protection key; for example, $K_{CP-1}$ may be used to derive an encryption key $K_{CP-1-ENC}$ and an integrity protection key $K_{CP-1-INT}$.

User Plane Connectivity

The RANN Session Anchor (RSA) function 706 provides a stable end point for receiving downlink traffic from a CN user plane function 306 in order to hide changes in radio link connectivity from the core network. Changes in radio link connectivity, which cause a UE's connection to the network to be switched from one RRE 710 to another RRE 710, may be the result of UE mobility or may be the result of changes in the radio link environment (e.g. increased interference).

DRB Traffic Steering

Figure 9:
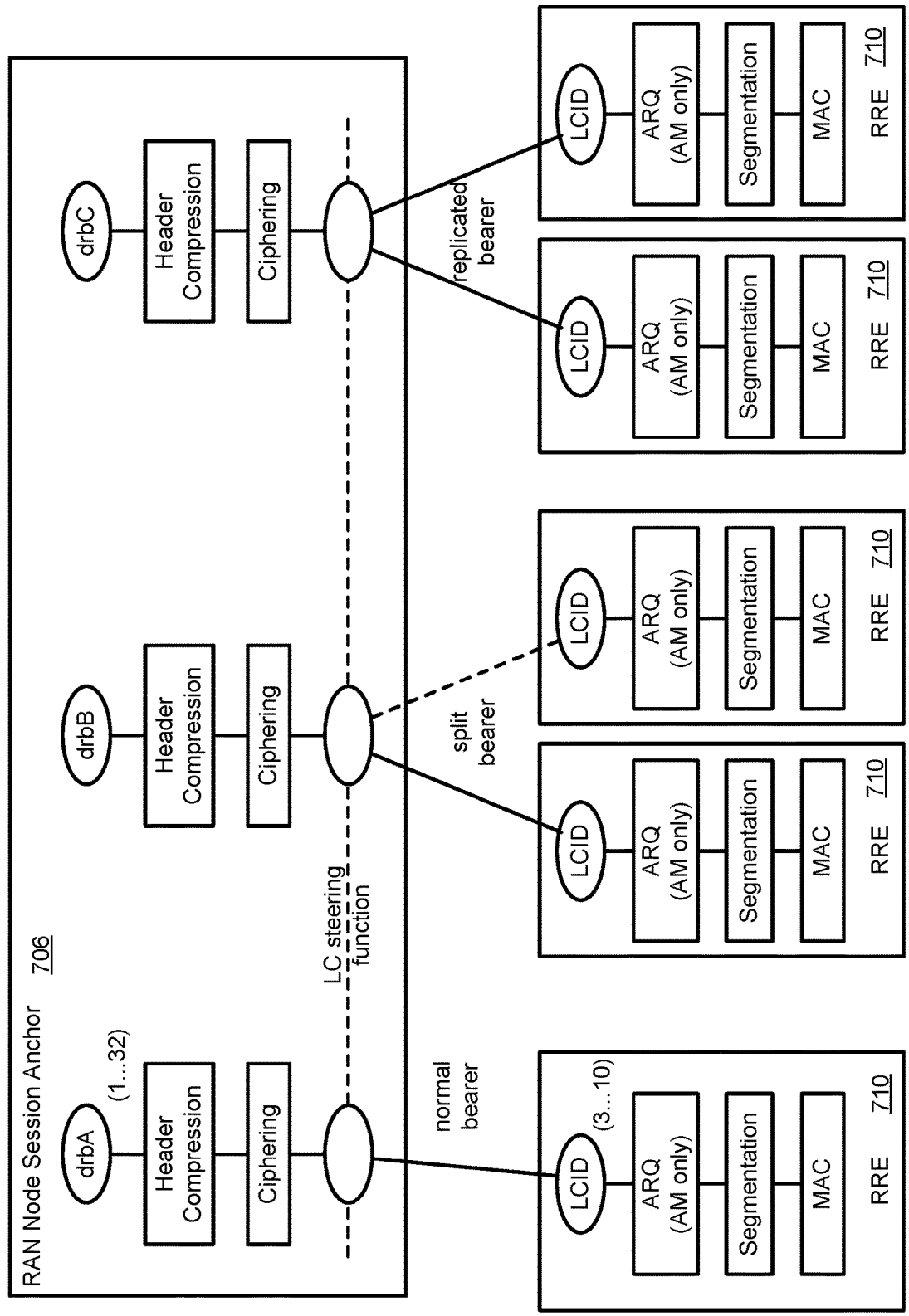
FIGS. 9A-C are a block diagrams illustrating DRB Traffic Steering in the case of a normal bearer (FIG. 9A), a split bearer (FIG. 9B), and a replicated bearer (FIG. 9C)

Referring to FIGS. 9A-9C, downlink traffic that is to be conveyed over a particular DRB to a UE 208 may be steered by the RSA 706 to one or more RREs 710:

if the UE 208 is positioned in a region with sufficiently high SINR, downlink traffic is normally routed to one RRE 710 (as shown in FIG. 9A, "normal bearer").

if the UE 208 is positioned in a region with coverage from more than one RRE 710, traffic may be routed through the RRE 710 with the "best" signal quality (as shown in FIG. 9B, "split bearer"). The indication used by the RSA 706 to switch traffic may be provided by any one or more of: a control plane message from RRM 708, based on measurement reports received from the UE 208 and/or from the RREs 710; an in-band user plane indication sent from an RRE 710 to the RSA 706 based on signal quality measurements performed by the RRE 710 (e.g. when signal quality crosses some pre-defined threshold); and in-band user plane measurements sent from the RREs 710 to the RSA 706 with the decision made autonomously by the RSA 706 based, for example, on pre-defined signal quality thresholds and a comparison of the received RRE 710 measurements.

if the UE 208 is positioned in a region with coverage from more than one RRE 710 but signal quality is not sufficiently high to support the required downlink or uplink traffic rate, traffic may be split across two or more RREs 710 (as shown in FIG. 9B, "split bearer") with some portion of the traffic forwarded through each RRE 710. Note also that uplink traffic may be forwarded through one set of RREs 710 and downlink traffic may be forwarded through a different set of RREs 710.

if the UE 208 is positioned in a region with coverage from more than one RRE 710 and the session QoS requirements include high reliability, downlink and uplink PDUs may be replicated and transmitted via different RREs 710 (as shown in FIG. 9C, "replicated bearer"). The same procedure can also be used to support lossless make-before-break handovers (described below).

Uplink traffic received from one or more RREs 710 may be merged by the RSA 706 before forwarding to the CN UPF 306. Traffic merging may involve one or more of:

replicated PDU removal, where PDCP sequence numbers are used to identify replicated PDUs.

PDU re-ordering, where PDCP sequence numbers are used to identify the order in which PDUs are to be delivered to the CN UPF 306.

Traffic steering may be controlled by RRM 708 based on radio link signal measurements provided by RREs 710 and/or by the UE 208. Reconfiguration of an RSA 706 to meet traffic steering requirements is performed by RSM 704 based on guidance from RRM 708.

2-Level QOS Flow Mapping (Downlink)

A downlink packet received from a CN user plane function 306 is marked with a QoS flow identifier (QFI) indicating the forwarding treatment to be provided to the packet (See in 3GPP Technical Report (TR) 23.799, "Study on Architecture for Next Generation System" (Dec. 30, 2015)). The forwarding treatment may include upper layer aspects that are typically associated with the protocols used within a session and lower layer aspects that are typically associated with efficient use of radio link resources.

Figure 10:
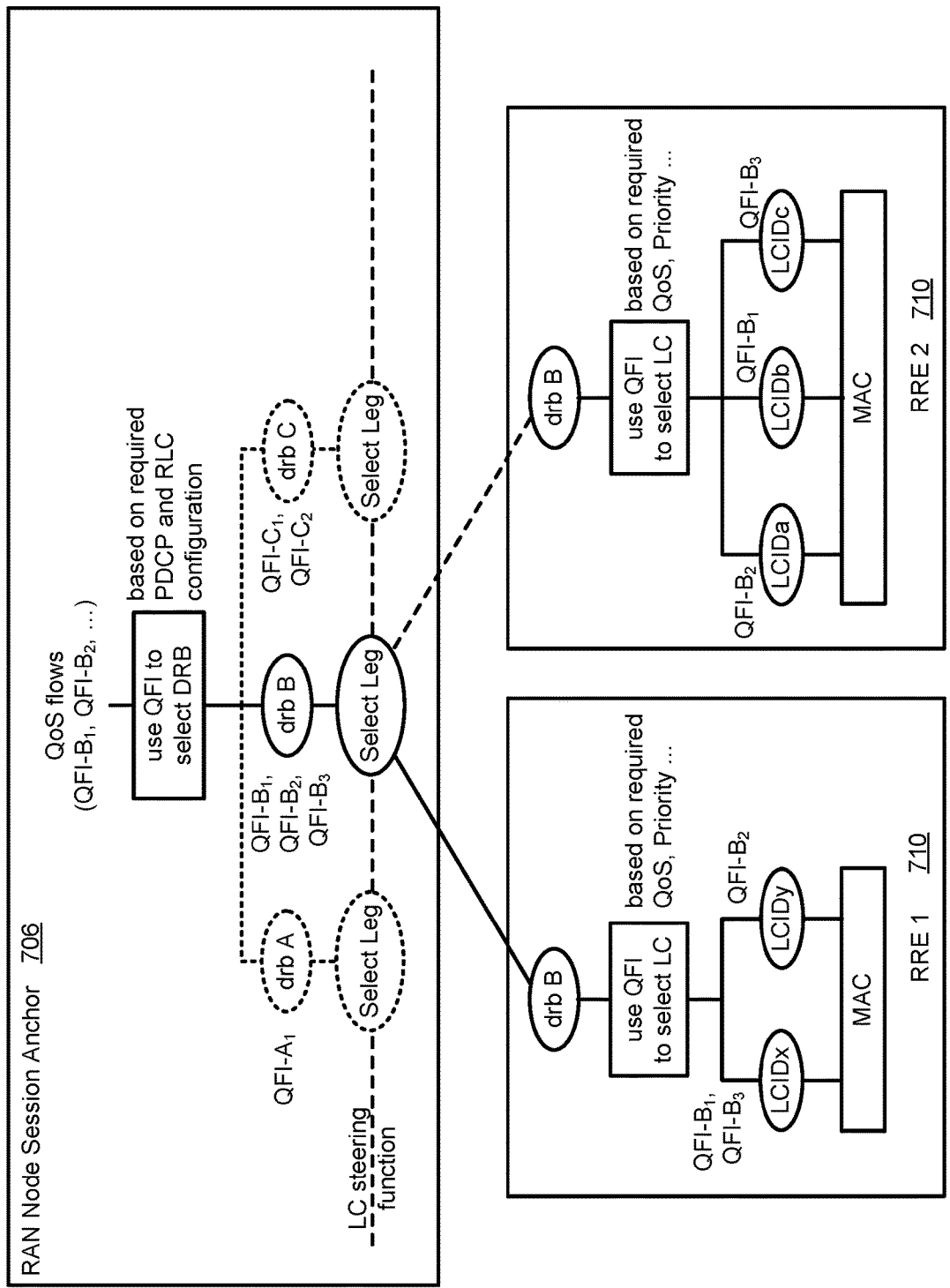
FIG. 10 is a block diagram illustrating DRB Downlink 2-level QoS Flow mapping.

As illustrated in FIG. 10, the RSM 704 configures the RSA 706 with the mapping from QFI to data radio bearer (DRB) based on upper-layer QoS requirements as it relates to PDCP configuration; this may include:

header compression;
in-order delivery;
ciphering (encryption and/or message integrity protection);
PDCP PDU loss recovery.

The RRM 708 configures the RRE 710 with the mapping from QFI to a logical channel (LCID) associated with the DRB, based on lower-layer QoS requirements as it relates to RLC and MAC configuration; this may include:

logical channel priority;
maximum and/or minimum data rate, measured as number of bits or packets over some time period;
RLC PDU loss recovery (e.g. assured mode or un-assured mode);
RLC timers (e.g. reassembly timer, acknowledgement timeout, polling timer);
number of HARQ processes;
HARQ timers (e.g. retransmission interval, acknowledgement timeout).

Radio resources may be a scarce commodity that must be shared amongst multiple, potentially competing, UEs. An RRE 710, in conjunction with RRM 708, operates to apportion use of shared radio resources based on real-time traffic demands from the set of UEs 208 served by the RRE 710. To this end, other entities (such as RSM 704) should not impose constraints on RRM 708 or RRE 710 that may affect radio resource allocation decisions.

Therefore the RSM 704 and the RRM 708 may make independent decisions to dynamically switch a QFI to a different DRB/LCID based on internal algorithms. However a decision by RSM 704 to change the DRB used to transport a packet with a given QFI should not impact the decision made by RRM 708 regarding the LCID used for that QFI. Similarly, a decision by RRM 708 to change the LCID used to transport a packet with a given QFI should not impact the decision made by RSM 704 regarding the DRB used for that QFI. This independence avoids signalling required to coordinate actions between RSM 704 and RRM 708 and also avoids any collateral signalling between RSM 704 and RSA 706 and between RRM 708 and RRE 710.

The following paragraphs describe how the functional model described above with reference to FIGS. 7-10 may be applied in various deployment scenarios. The choice of deployment scenario may be based on one or more of:

session requirements. Different UE sessions may have different QoS and/or security requirements that affect where various RAN node functions may be located. For example: a session with low latency requirements may dictate that all functions be placed close to the RAN node radio edge 710; a session involving the exchange of sensitive information may dictate that all RAN node 702 cryptographic operations be performed in a secure data centre.

UE service profile. Different UEs may have different service requirements that affect where various RAN node functions may be located. For example: a UE associated with a particular virtual mobile network operator (VMNO) or with a particular enterprise customer may require all traffic to be routed through a designated gateway; a low-cost machine-type communications (MTC) device may have a fixed configuration and may require use of specialised RRM 708, RSM 704 and/or RSA 706 functions.

MNO network design. A mobile network operator may choose a particular partitioning of functions in order to optimise network cost or performance. For example: RSA 706 functions may be centrally located to exploit the use of PDCP encryption over a backhaul network; this eliminates the need for additional transport layer security protocols such as IPsec and may reduce costs by eliminating the need for separate security gateways; locating all cryptographic operations in a secure data centre may enhance network security and reduce the requirements for secured cell sites; locating non-real time control plane functions in central data centre may enable use of network function virtualisation (NFV) for these functions which may lower costs and provide greater scalability; locating user plane operations close to a cell site may enable local traffic breakout and reduce backhaul costs.

vendor product design. A RAN node vendor may choose a particular partitioning of functions in order to optimise product cost and performance or to protect the intellectual property embodied in elements of the product.

Deployment Scenario A

Figure 11:
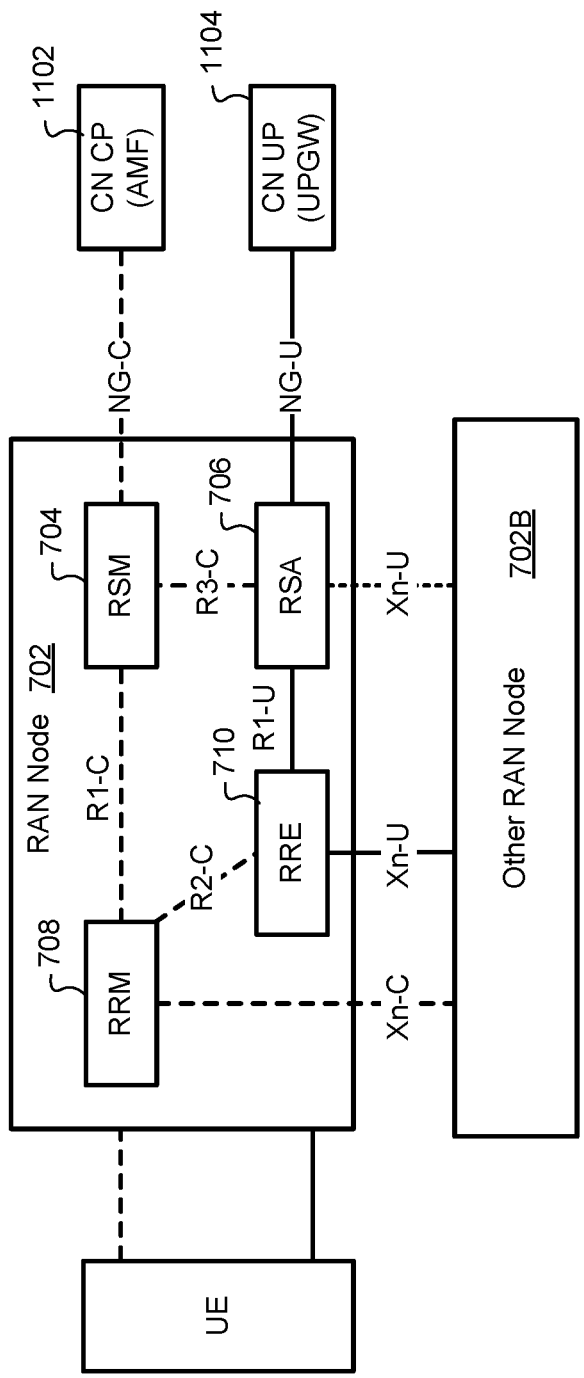
FIGS. 11-18 are block diagrams illustrating respective example Deployment Scenarios usable in embodiments of the present invention.

Scenario A shown in FIG. 11 illustrates the general model for dispersing RAN node 702 functions to different locations within an MNO network. The interaction between entities of the functional mode may be defined through various interface reference points; for example:

R1-C may define the control plane interface between a RANN resource management (RRM) function 708 and a RANN session management (RSM) function 704. This may, for example, be similar to a 3GPP F1-C interface.

R1-U may define the user plane interface between a RANN radio edge (RRE) function 710 and a RANN session anchor (RSA) function 706. This may, for example, be similar to a 3GPP F1-U interface.

R2-C may define the control plane interface between a RANN resource management (RRM) function 708 and a RANN radio edge (RRE) function 710.

R3-C may define the control plane interface between a RANN session management (RSM) function 704 and a RANN session anchor (RSA) function 706. This may, for example, be similar to a 3GPP E1 interface.

Also in the general model:

NG-C, the control plane interface to the CN access management function (AMF) 1102, is handled by the RANN session management (RSM) function 704.

NG-U, the user plane interface to the CN user plane gateway (UPGW) 1104, is handled by the RANN session anchor (RSA) function 706.

Xn-C, the control plane interface to a neighbouring RAN node, is handled by the RANN resource management (RRM) function 708.

Xn-U, the user plane interface to a neighbouring RAN node, is normally handled by the RANN radio edge (RRE) function 710. However, in some scenarios (e.g. Deployment Scenario C, described below), Xn-U may be handled by the RANN session anchor (RSA) function 706.

Deployment Scenario B

Figure 12:
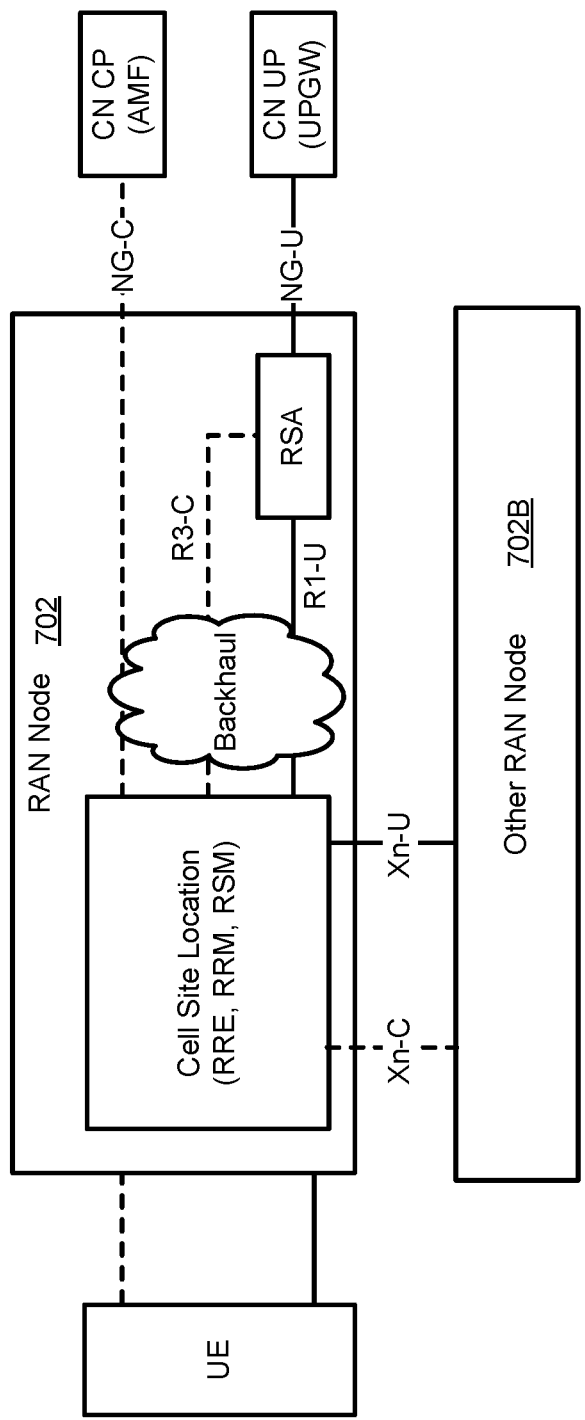

Scenario B1 in FIG. 12 illustrates the deployment of RSA 706 functions close to CN UP functions 306 (e.g. a user plane gateway, UPGW 1104) while co-locating all other functions of the RAN node 702 at a cell site. This may be used, for example, to protect user plane traffic over a backhaul network carrying R1-U by exploiting the use of PDCP encryption between the UE 208 and the RSA 706 function.

Figure 13:
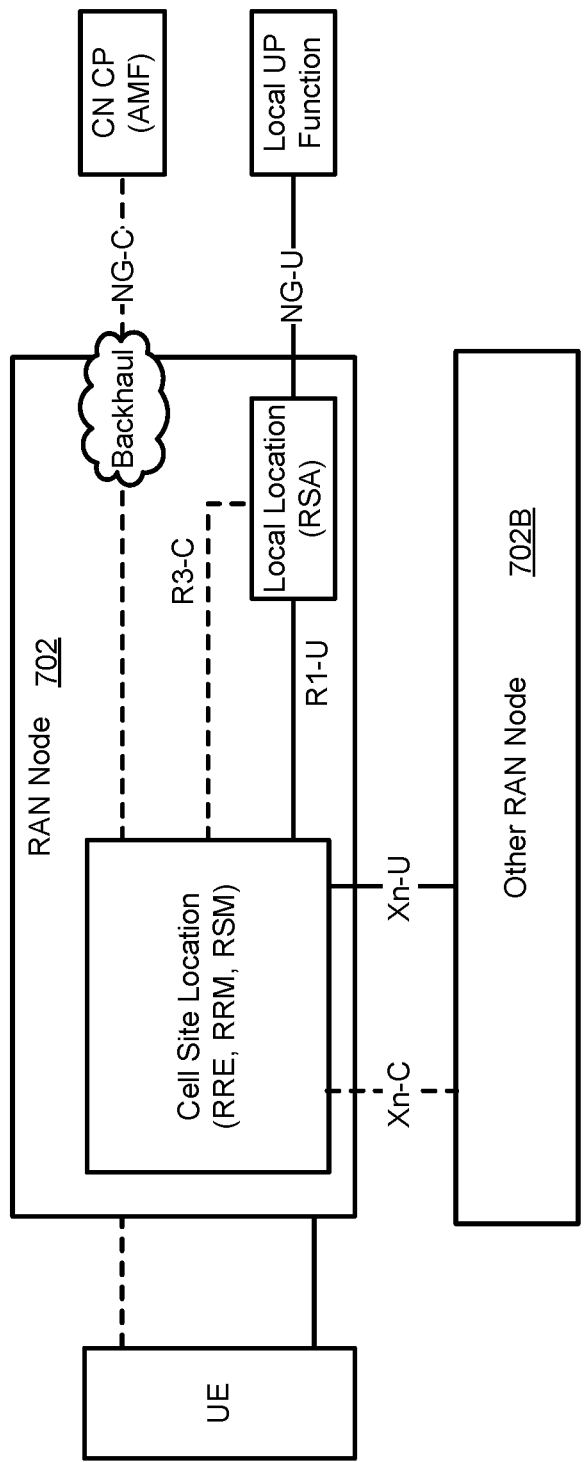

Scenario B2 in FIG. 13 illustrates how this configuration may also be used to forward session traffic to a local breakout point or to a mobile edge computing (MEC) function in order to avoid the cost and/or latency of conveying traffic over a backhaul network.

Deployment Scenario C

Figure 14:
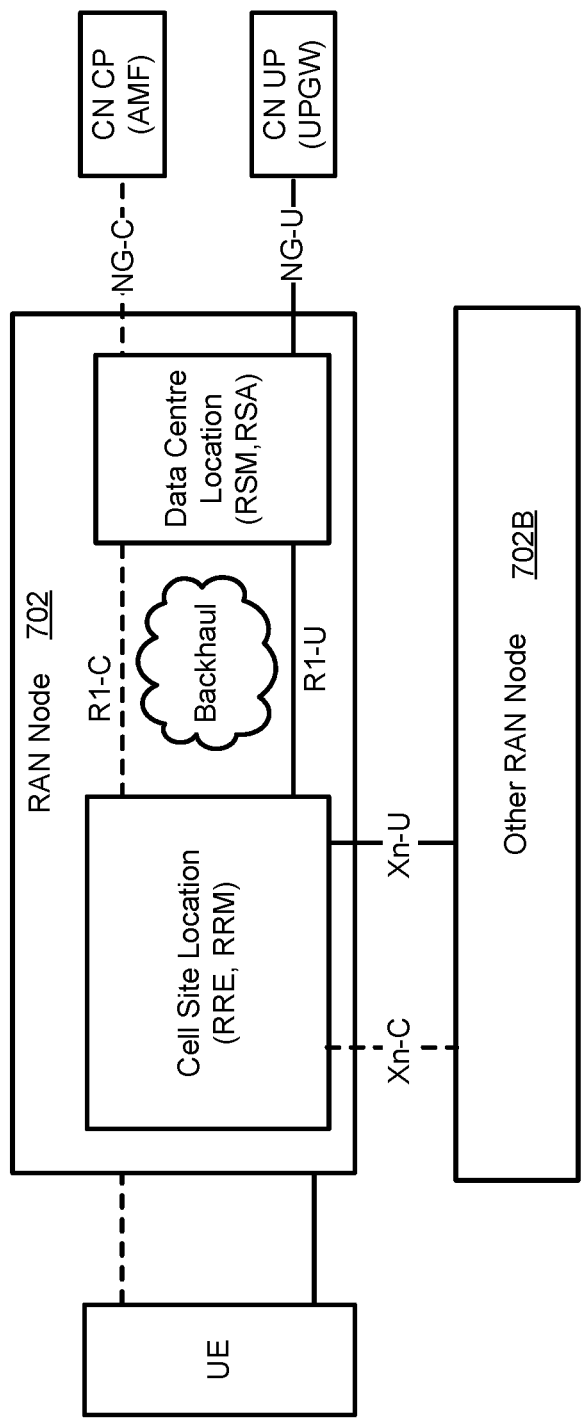

Scenario C1 in FIG. 14 illustrates the deployment of RSM 704 and RSA 706 functions in a data centre. This may be used, for example, to isolate cryptographic operations in a secured environment or to allow RSM 704 and RSA 706 deployment as virtualised functions within a common data centre server pool.

Figure 15:
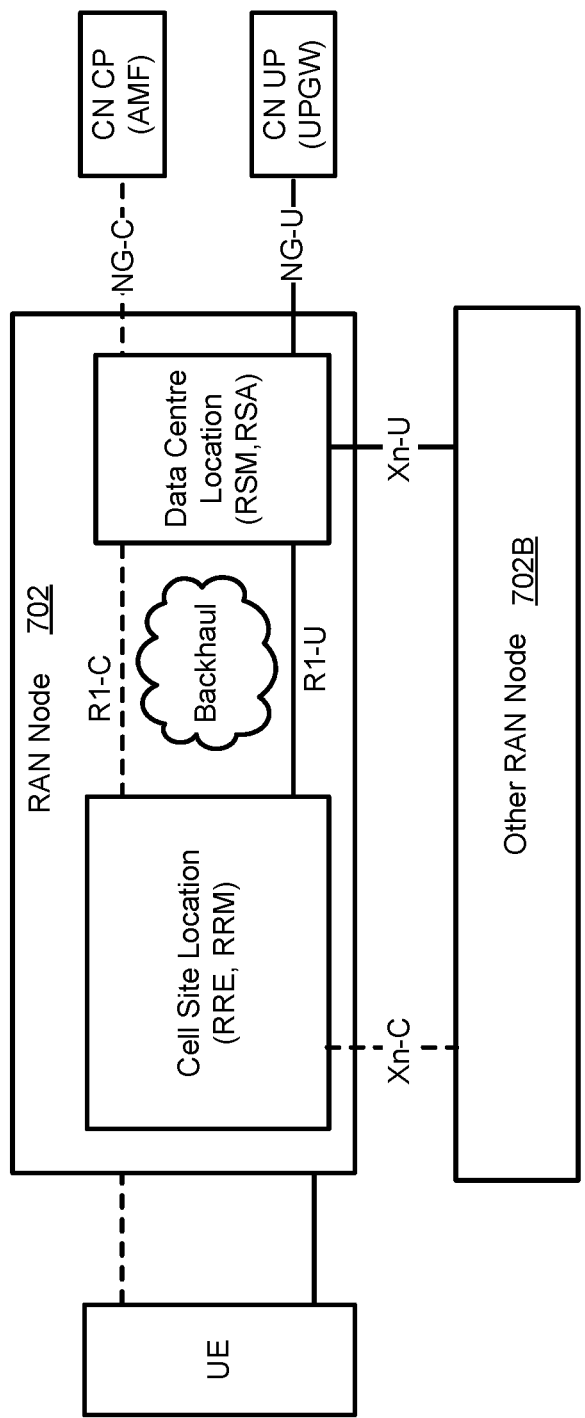

Scenario C2 in FIG. 15 illustrates a similar deployment with RSM 704 and RSA 706 functions in a data centre. In this scenario, the user plane connection to another RAN node 702B (Xn-U) is handled by an RSA 706 in the centralised location. This may be used, for example, to minimise backhaul latency and costs in a handover situation by removing the direct Xn connection between remote cell site locations.

Deployment Scenario D

Figure 16:
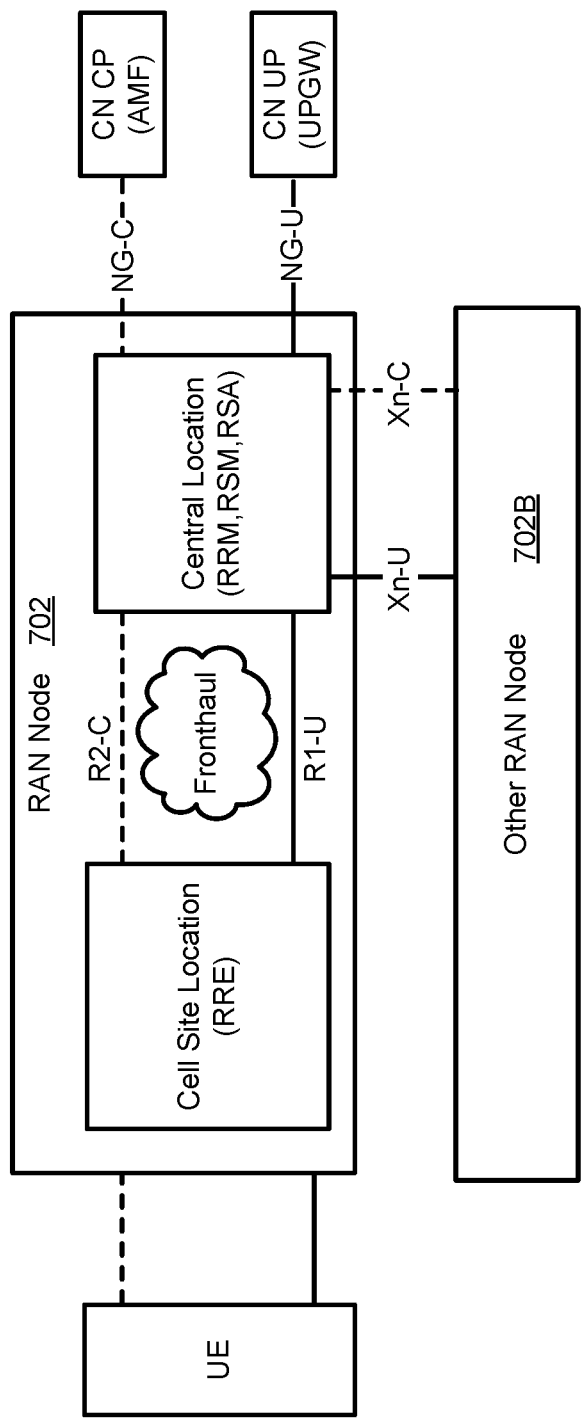

Scenario D in FIG. 16 illustrates the deployment of all functions except RRE 710 in a centralised location. This may be used, for example, to support coordinated multipoint (CoMP) operations across multiple RREs 710.

Deployment Scenario E

Figure 17:
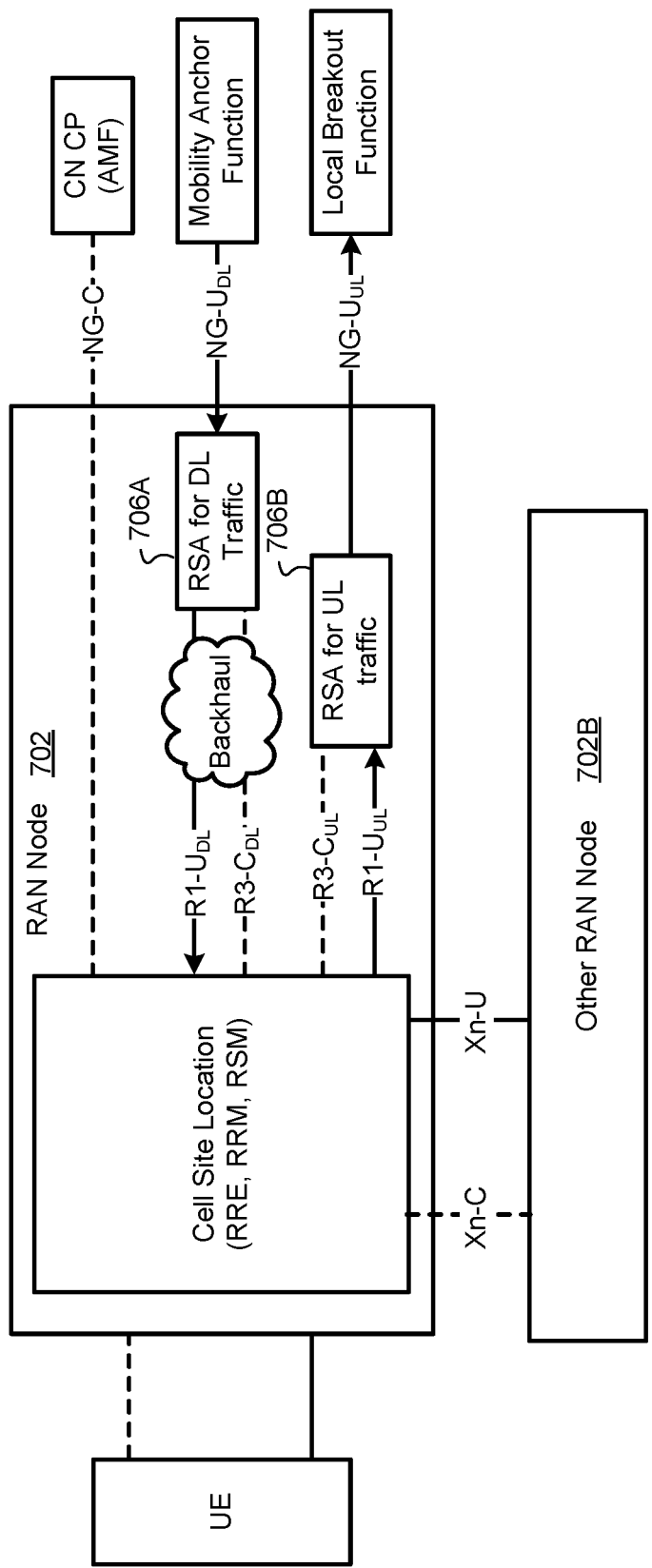

Scenario E in FIG. 17 illustrates a deployment where uplink traffic for a session is handled by one RSA 706B and downlink traffic for that session is handled by a different RSA 706A. This may be used, for example, to forward uplink traffic to a local breakout function in order to reduce backhaul latency and/or cost while routing downlink traffic through a centralised mobility anchor function.

Deployment Scenario F

Figure 18:
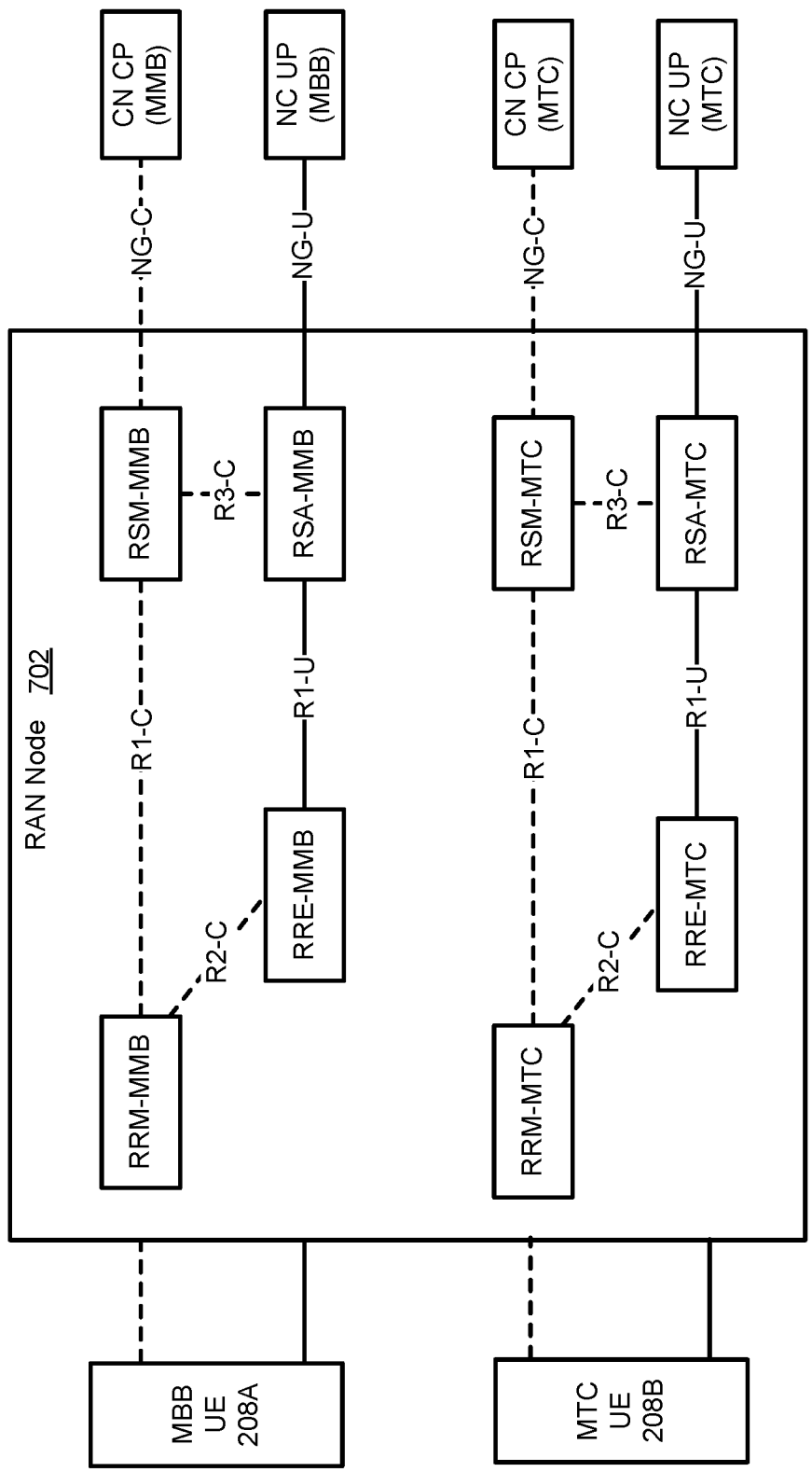

Scenario F in FIG. 18 illustrates a deployment where the functional entity selected to serve a particular UE or UE session is tailored to the specific needs of that UE or session. This may be used, for example, to provide specialised functions and procedures for low cost machine-type communications (MTC) devices 208B that are distinct from the functions and procedures required for high end mobile broadband (MBB) devices 208A.

Where functions are located within the network may also be tailored to the needs of particular devices based, for example, on:

the device communications model. An MTC device 208B typically transmits short messages at sporadic times with long intervals between transmissions. By contrast, an MBB device 208A typically transmits bursts of packets at high rates with relatively short intervals between transmissions.

the service model. An MTC device 208B may be managed by a corporate enterprise customer as part of a massive commercial deployment. By contrast, an MBB device 208A is typically associated with a single consumer customer.

the mobility model. Many MTC devices 208B such as sensors and actuators are stationary and are linked to a fixed geographic location. By contrast, MBB devices 208A are typically mobile and expect to receive service anywhere within the MNO coverage area.

Interaction Between Functional Entities

FIGS. 19A-22C are message sequence diagrams illustrating interactions between the RANN functional entities described above with reference to FIGS. 6A-10 in various procedures.

Initial Attachment

Figure 19A:
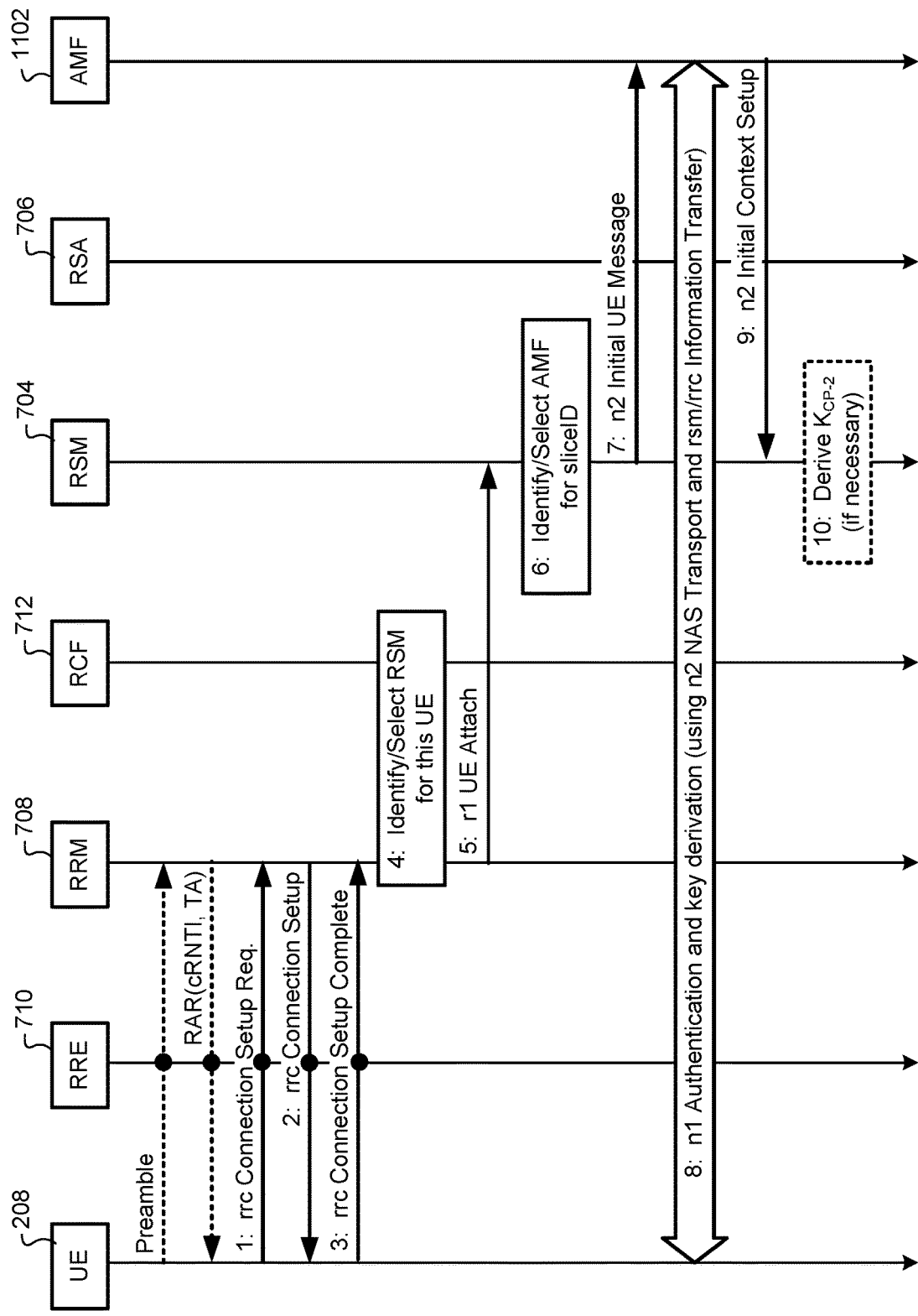
FIGS. 19A-B is a message sequence diagram illustrating an example process for initial attachment usable in embodiments of the present invention.
Figure 19B:
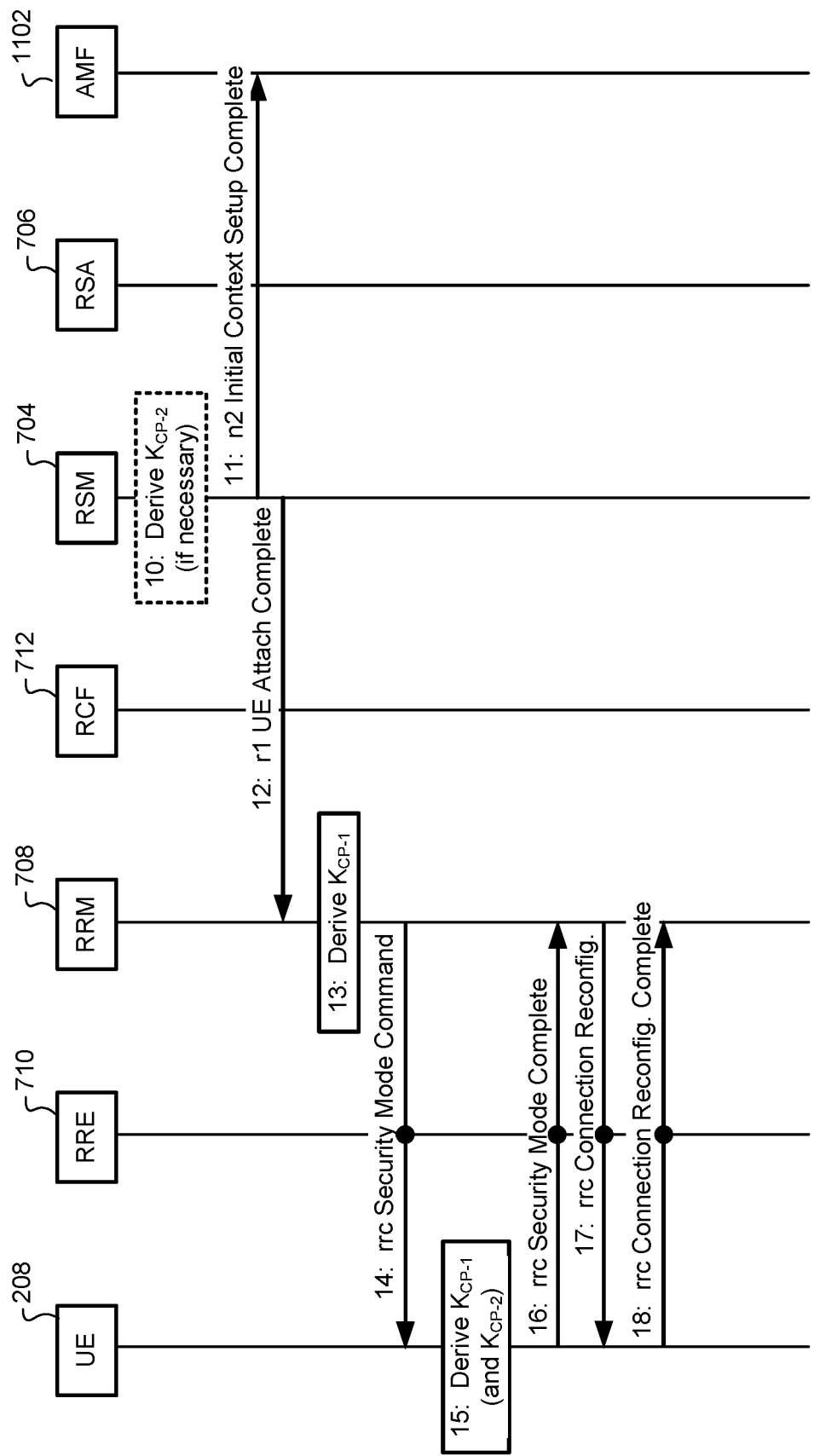

FIGS. 19A and 19B are message sequence diagrams illustrating interactions between the RANN functional entities during an initial attachment procedure. As may be seen in FIGS. 19A and 19B, this procedure may include the following steps:

(Step 1): Following a successful random access procedure, for example, the UE 208 sends an "rrc Connection Setup Request" message to the RRM 708 via the RRE 710. The rrc Connection Setup Request may include a UE identifier (ueID) as a parameter. Conventionally, the rrc Connection Setup Request may be sent using SRB0.

(Step 2): RRM 708 sends an "rrc Connection Setup" message to the UE 208 via the RRE 710. The "rrc Connection Setup" message may include the UE identifier (ueID) received from the UE 208 in step 1 as a parameter. Conventionally, the "rrc Connection Setup" message may be sent using SRB0.

(Step 3): Upon completion of the connection setup procedure, the UE 208 sends an "rrc Connection Setup Complete" message to the RRM 708 via the RRE 710. The rrc Connection Setup Complete message may include a slice identifier (sliceID) and a NAS message (nasMSG) as parameters. Conventionally, the rrc Connection Setup Complete message (and subsequent messaging to and from the UE 208) may be sent using SRB1.

(Step 4): Upon receipt of the "rrc Connection Setup Complete" message from the UE 208, the RRM 708 may interact with the RCF 712 to identify or select an RSM 704 to use for the UE 208 (or for the initial session for UE 208).

(Step 5): RRM 708 sends an "r1 UE Attach" message to the selected RSM 704. The "r1 UE Attach" message may include the ueID, cell identifier (cellID) associated with the cell currently serving the UE 208, sliceID and nasMSG as parameters.

(Step 6): Upon receipt of the "r1 UE Attach" message, the RSM 704 may identify or select an AMF 1102 to use for the sliceID.

(Step 7): RSM 704 sends an "n2 Initial UE message" to the selected AMF 1102. The n2 Initial UE message may include the ueLocation, sliceID and nasMSG as parameters.

(Step 8): AMF 1102 and UE 208 interact via RSM 704, RRM 708 and RRE 710 to complete authentication and key derivation.

(Step 9): Upon successful completion of Authentication and key derivation, the AMF 1102 and sends an "n2 Initial Context Setup" to the RSM 704. The n2 Initial Context Setup message may include the ueCapabilities and ueCryptoMaterial as parameters.

(Step 10): Upon receipt of the n2 Initial Context Setup message, the RSM 704 may derive the $K_{CP-2}$ key.

Continuing in FIG. 19B, at (Step 11): RSM 704 sends "n2 Initial Context Setup Complete" message to the AMF 1102.

(Step 12): RSM 704 sends "r1 UE Attach Complete" message to the RRM 708. The r1 UE Attach Complete message may include the ueCapabilities and rrmCryptoMaterial as parameters (Step 13): Upon receipt of the "r1 UE Attach Complete" message, the RRM 708 may derive the $K_{CP-1}$ key.

(Step 14): RRM 708 sends "rrc Security Mode Command" message to the UE 208. The "rrm Security Mode Command" message may contain a security algorithm indication as a parameter.

(Step 15): Upon receipt of the "rrc Security Mode Command" message, the UE 208 may derive the $K_{CP-1}$ and (if needed) $K_{CP-2}$ keys.

(Step 16): UE 208 sends "rrc Security Mode complete" message to the RRM 708.

(Step 17): RRM 708 sends "rrc Connection Reconfiguration" message to the UE 208.

(Step 18): UE 208 sends "rrc Connection Reconfiguration complete" message to the RRM 708.

At this point, no user plane (DRB) radio resources have been configured. This will occur during subsequent session establishment, as described below with reference to FIGS. 20A and 20B.

Figure 20A:
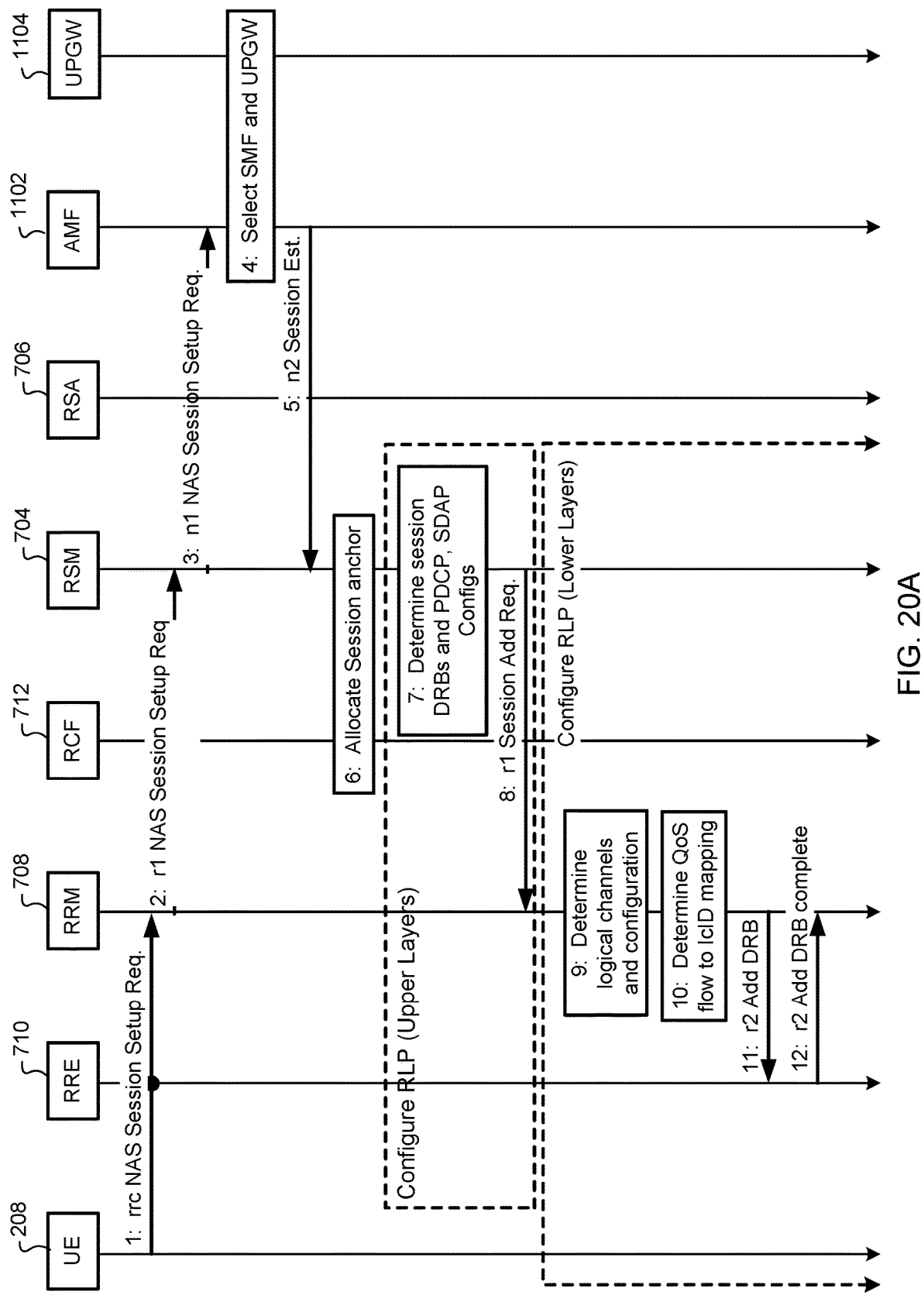
FIGS. 20A-B is a message sequence diagram illustrating an example process for Session Establishment usable in embodiments of the present invention.
Figure 20B:
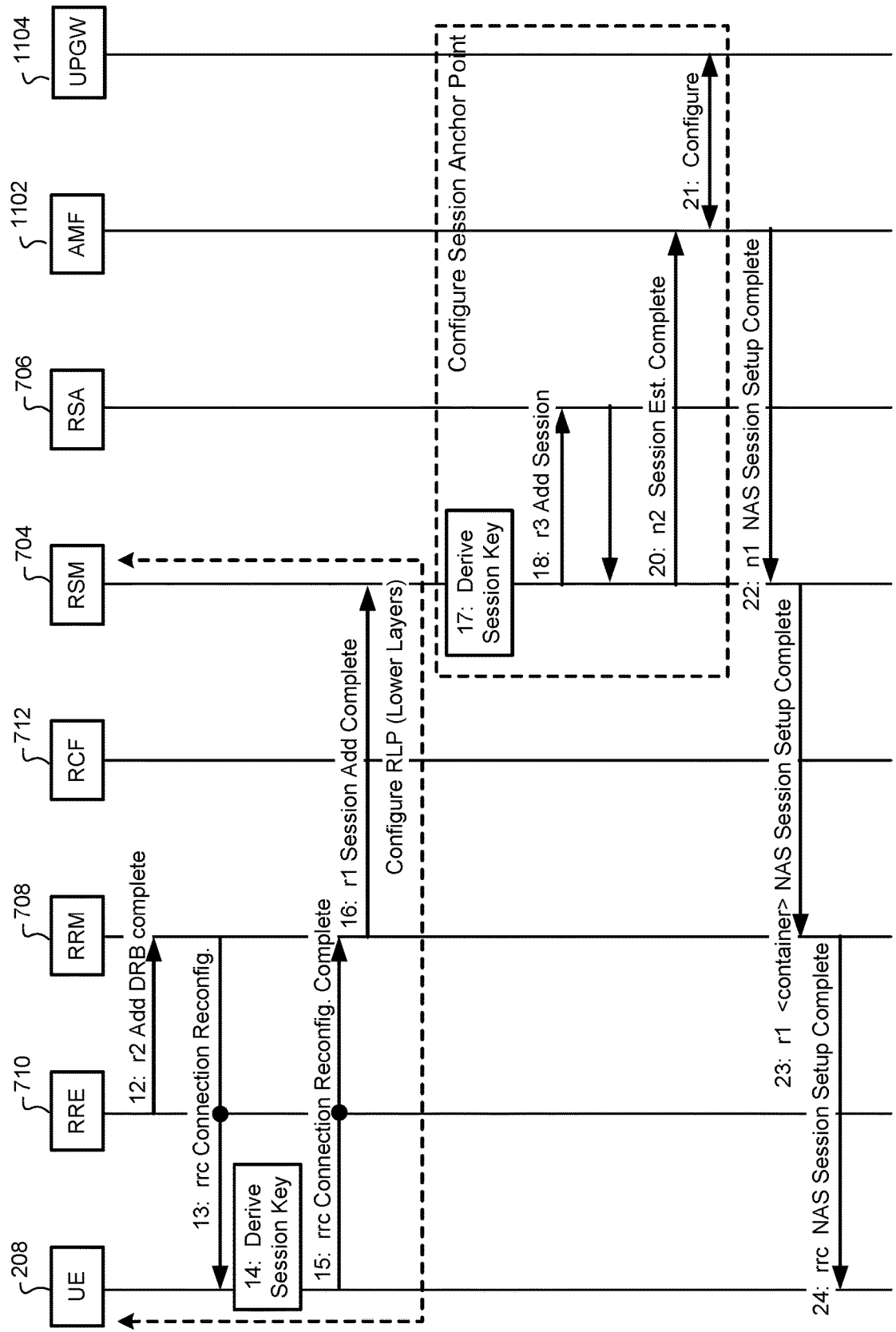

FIGS. 20A and 20B show a message sequence diagram illustrating interactions between the RANN functional entities during a Session Establishment procedure. As may be seen in FIGS. 20A and 20B, this procedure may include the following steps:

(Step 1): UE 208 sends an "rrc NAS Session Setup Request" message to the RRM 708 via the RRE 710. The rrc NAS Session Setup Request may include a temporary Identifier (tempID) and a session-NSSAI (s-NSSAI) as parameters.

(Step 2): RRM 708 forwards the "NAS Session Setup Request" message to the RSM 704 in an R1-C transparent message container. The R1-C message may include the tempID and s-NSSAI as parameters.

(Step 3): RSM 704 forwards the NAS "Session Setup Request" message to the AMF 1102. The "n1 NAS Session Setup Request" message may include the tempID and s-NSSAI received from the UE 208 along with a parameter indicating the current location of the UE 208.

(Step 4): Upon receipt of the "NAS Session Setup Request" message, the AMF 1102 may select a session management function (SMF) and UPGW 1104 for the session. The selection may be based on the UE 208 location indication provided by the RSM 704.

(Step 5): AMF 1102 sends an "n2 Session Establishment" message to the RSM 704. The "n2 Session Establishment" message may include session identifier (sessionID), QOS Profile indications (qosProfiles), UPGW 1104 transport layer address indications (upgw@) and gateway location indications (gwLocation) as parameters.

(Step 6): Upon receipt of the "n2 Session Establishment" message, the RSM 704 may interact with the RCF to allocate a RANN session anchor. Selection of the RSA 706 may be based on the gateway location indication received from the AMF 1102. This yields the RSA 706 transport layer address indication "anchor@".

Once the RSA 706 has been chosen, the upper layers of the Radio Link Protocol (RLP) stack can be configured. Thus:

(Step 7): RSM 704 determines the session DRBs and PDCP and SDAP configurations.

(Step 8): RSM 704 sends an "r1 Session Add Request" message to the RRM 708. The "r1 Session Add Request" message may include the ueID, anchor@, and the list of: DRB identifiers (drbIDs), QoS profiles (qosProfiles), RLC configuration information (rlcConfig), and PDCP configuration information (pdcpContainer) as parameters.

Once the upper layers of the Radio Link Protocol (RLP) stack have been configured, the lower layers of the RLP stack can be configured. Thus:

(Step 9): For each drbID, the RRM 708 determines required logical channels and configuration.

(Step 10): For each drbID, the RRM 708 determines required QOS flow to Logical Channel Identifier (LCID) mapping.

(Step 11): RRM 708 sends an "r2 Add DRB" message to the RRE 710. The "r2 Add DRB" message may include the list of drbID, LCID, qosConfig and anchor@ as parameters.

(Step 12): RRE 710 sends an "r2 Add DRB Complete" message to the RRM 708. The "r2 Add DRB Complete" message may include a transport layer address for use in the serving cell (cell@) as a parameter.

Continuing on FIG. 20B, at (Step 13): RRM 708 sends an "rrc Connection Reconfiguration" message to the UE 208 via the RRE 710. The "rrc Connection Reconfiguration" message may contain the list of drbID, LCID, MAC configuration information (macConfig), rlcConfig, pdcpConfig and sdapConfig as parameters.

(Step 14): Upon receipt of the "rrc Connection Reconfiguration" message, the UE 208 derives a session key and associated user plane encryption and integrity protection keys.

(Step 15): UE 208 sends an "rrc Connection Reconfiguration Complete" message to the RRM 708 via the RRE 710.

(Step 16): RRM 708 sends an "r1 Session Add Complete" message to the RSM 704. The "r1 Session Add Complete" message may contain the list of drbID, qosProfileID, and cell@ as parameters.

Once the lower layers of the Radio Link Protocol (RLP) stack have been configured, the Session Anchor Point can be configured. Thus:

(Step 17): RSM 704 derives a session key and associated user plane encryption and integrity protection keys.

(Step 18): RSM 704 sends an "r3 Add Session" message to the RSA 706. The "r3 Add Session" message may include the sessionID, sessionKeys, cell@ and list of drbID, pdcpConfig and sdapConfig as parameters.

(Step 19): RSA 706 sends an "r3 Add Session Complete" message to the RSM 704.

(Step 20): RSM 704 sends an "n2 Session Establishment Complete" message to the AMF 1102. The "n2 Session Establishment Complete" message may include the anchor@ as a parameter.

(Step 21): Upon receipt of the "n2 Session Establishment Complete" message, the AMF 1102 may interact with the SMF and UPGW 1104 to configure, for example, the RSA 706 transport layer address (anchor@) for this session.

(Step 22): Once the UPGW 1104 has been configured, the AMF 1102 sends an "n1 NAS Session Setup Complete" message towards the UE 208 via the RSM 704. The "n1 NAS Session Setup Complete" message may include a tempID and sessionConfig as parameters.

(Step 23): RSM 704 forwards the NAS "Session Setup Complete" message to the RRM 708 in an R1-C transparent message container. The NAS "Session Setup Complete" message may include the tempID and sessionConfig as parameters.

(Step 24): RRM 708 forwards the NAS "Session Setup Complete" message to the UE 208 in an RRC transparent message container. The NAS "Session Setup Complete" message may include the tempID and sessionConfig as parameters.

Figure 21A:
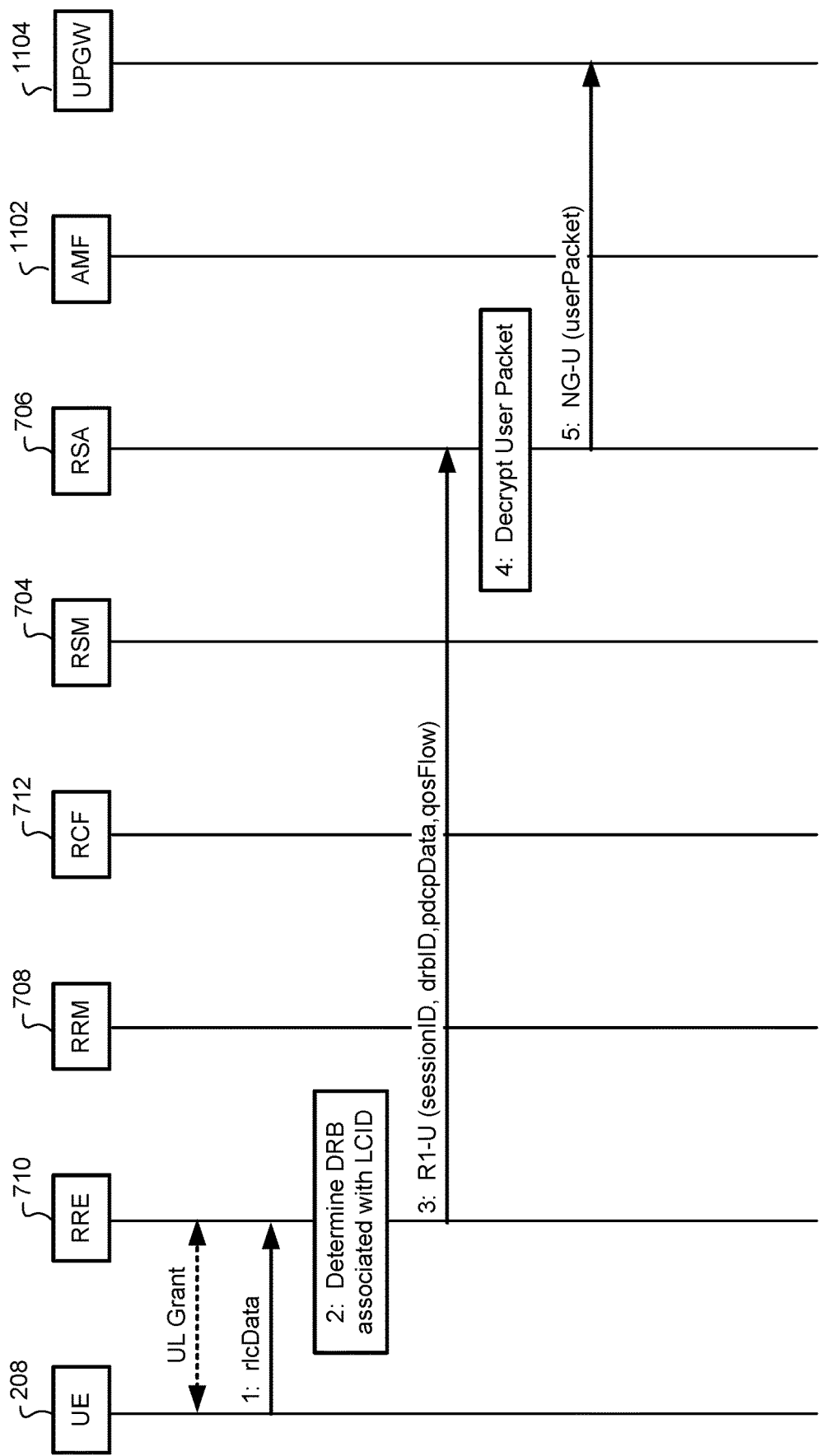
FIGS. 21A-B is a message sequence diagram illustrating an example process for Information Exchange usable in embodiments of the present invention.

FIG. 21A is a message sequence diagram illustrating interactions between the RANN functional entities for uplink transmission following successful completion of the Session Establishment procedure described above. As may be seen in FIG. 21A, this procedure may include the following steps:

(Step 1): UE 208 sends an RLC data PDU to the RRE 710. The RLC data PDU may include the LCID, pdcpData, and qosFlow as parameters.

(Step 2): Upon receipt of the RLC data PDU, the RRE 710 determines the DRB associated with the LCID.

(Step 3): RRE 710 determines the anchor@ associated with the DRB and sends an R1-U PDU to the RSA 706 indicated by the anchor@. The R1-U PDU may include the sessionID, drbID, pdcpData and qosFlow as parameters.

(Step 4): upon receipt of the R1-U PDU, the RSA 706 decrypts the user packet and validates the integrity protection code (if configured) using the PDCP context associated with the drbID.

(Step 5): RSA 706 sends an NG-U PDU containing the user packet to the UPGW 1104 indicated by the upgw@ associated with the drbID.

Figure 21B:
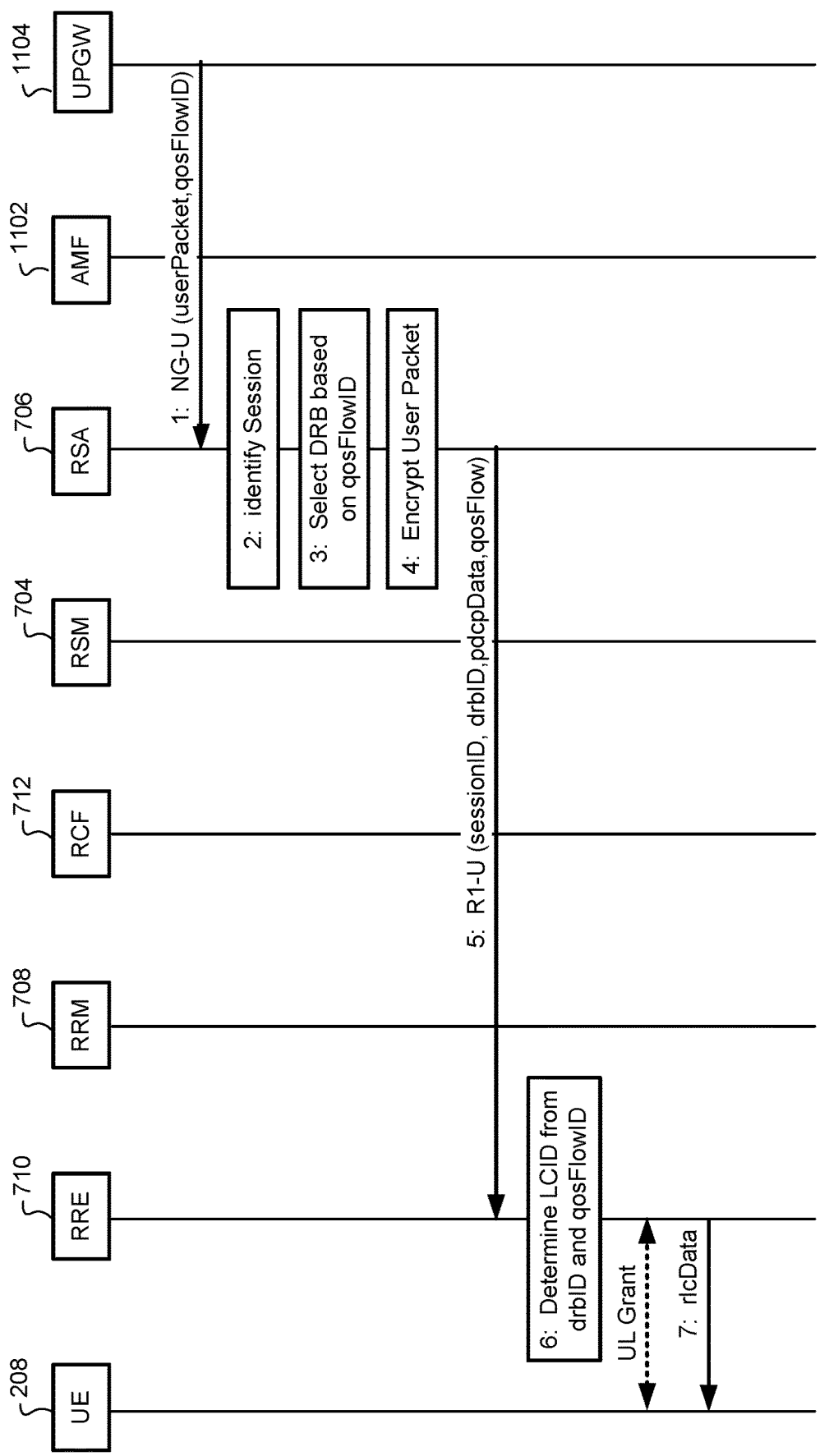

FIG. 21B is a message sequence diagram illustrating interactions between the RANN functional entities for downlink transmission following successful completion of the Session Establishment procedure described above. As may be seen in FIG. 21B, this procedure may include the following steps:

(Step 1): UPGW 1104 sends an NG-U PDU containing the user packet and the qosFlowID to the RSA 706 indicated by the anchor@ associated with the session.

(Step 2): Upon receipt of the NG-U PDU, the RSA 706 identifies the session.

(Step 3): RSA 706 selects the DRB based on the qosFlowID.

(Step 4): RSA 706 encrypts the user packet and attaches an integrity protection code (if configured) using the PDCP context associated with the DRB.

(Step 5): RSA 706 sends an R1-U PDU to the RRE 710 indicated by the cell@ associated with the DRB. The R1-U PDU may include the sessionID, drbID, pdcpData and qosFlow as parameters.

(Step 6): Upon receipt of the R1-U PDU, the RRE 710 identifies the LCID from the drbID and qosFlow.

(Step 7): RRE 710 sends an RLC data PDU to the UE 208. The RLC data PDU may include the LCID, pdcpData, and qosFlow as parameters.

Figure 22A:
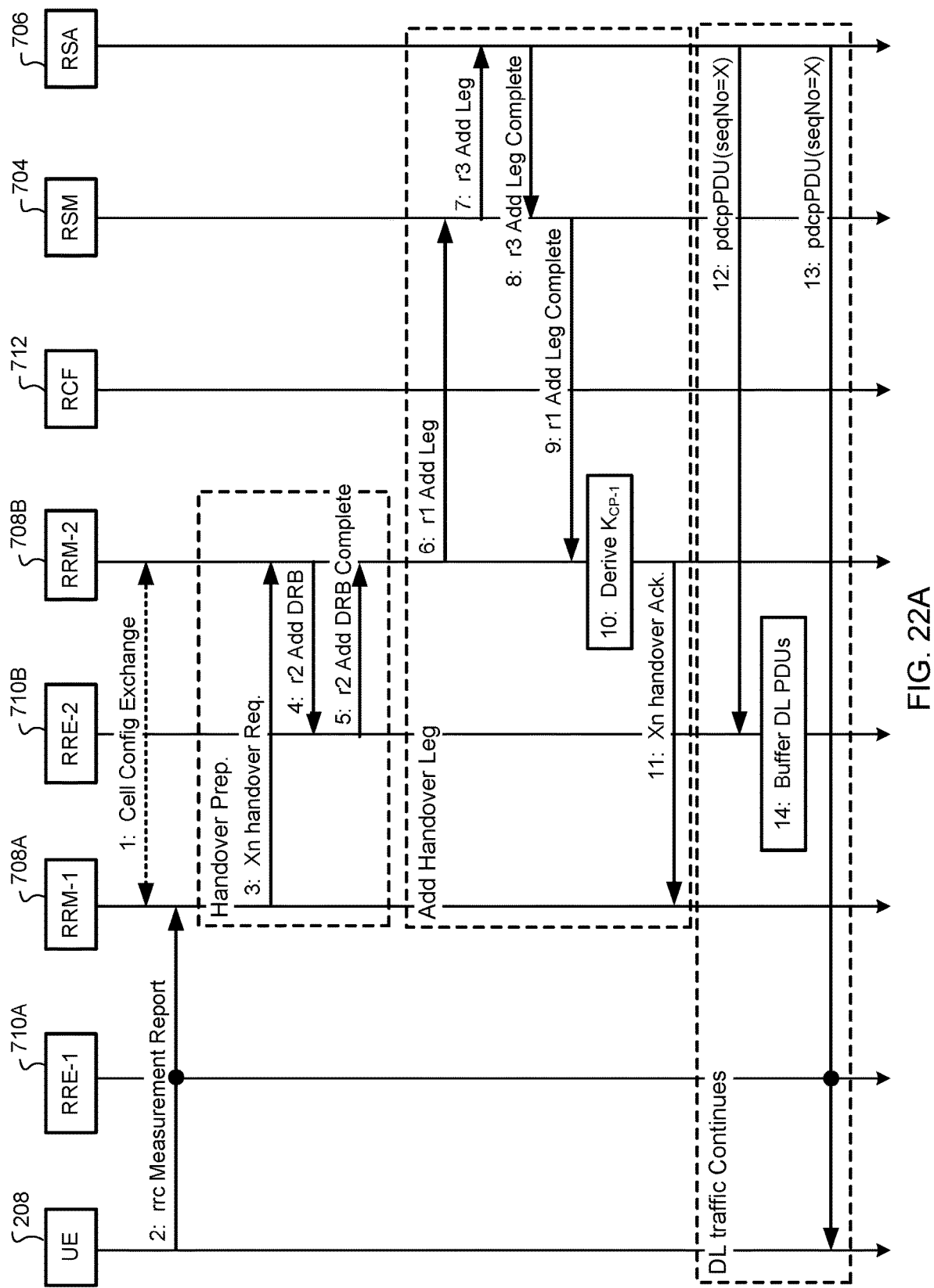
FIGS. 22A-C is a message sequence diagram illustrating an example process for Handover (Make-Before-Break) usable in embodiments of the present invention.
Figure 22B:
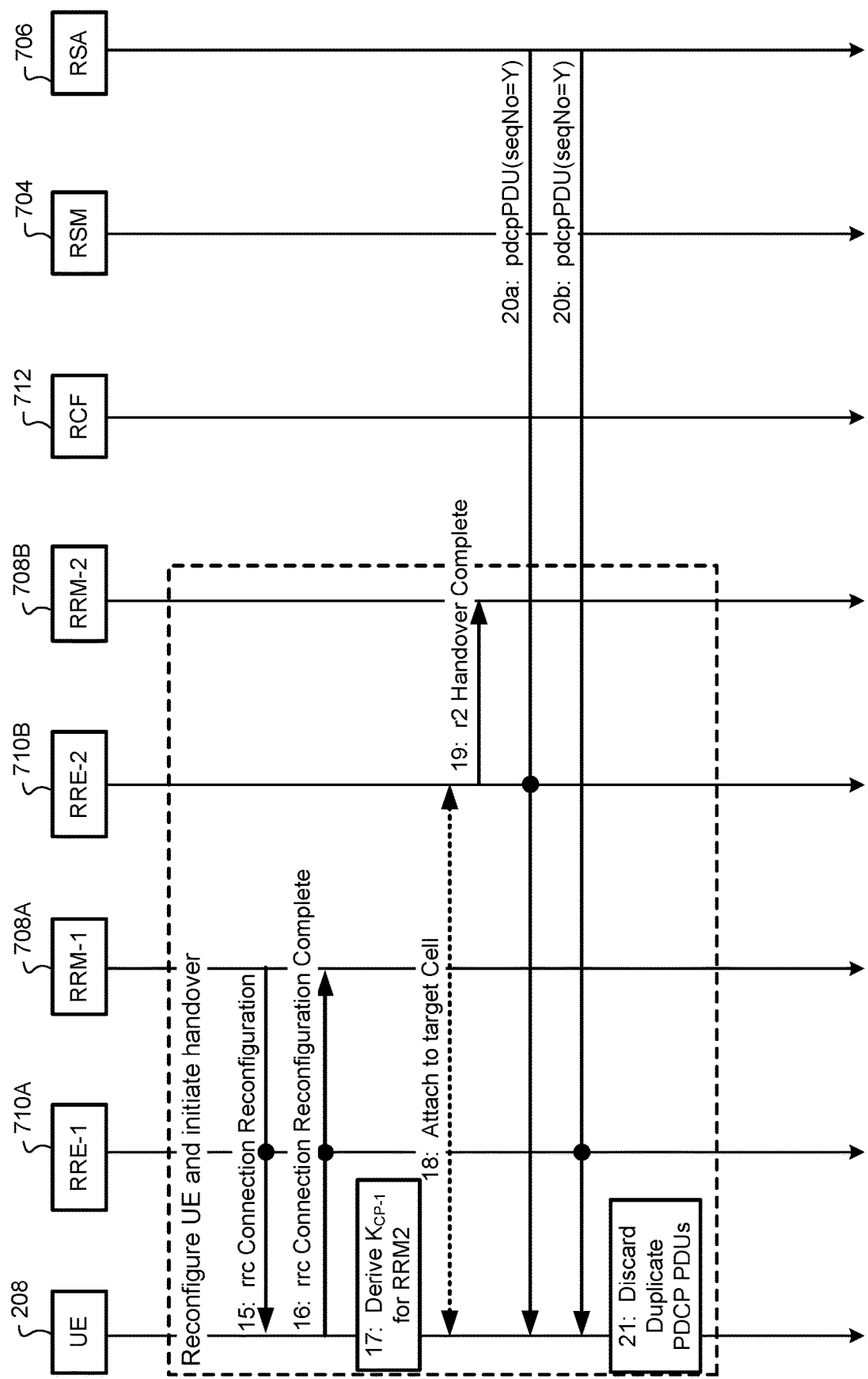
Figure 22C:
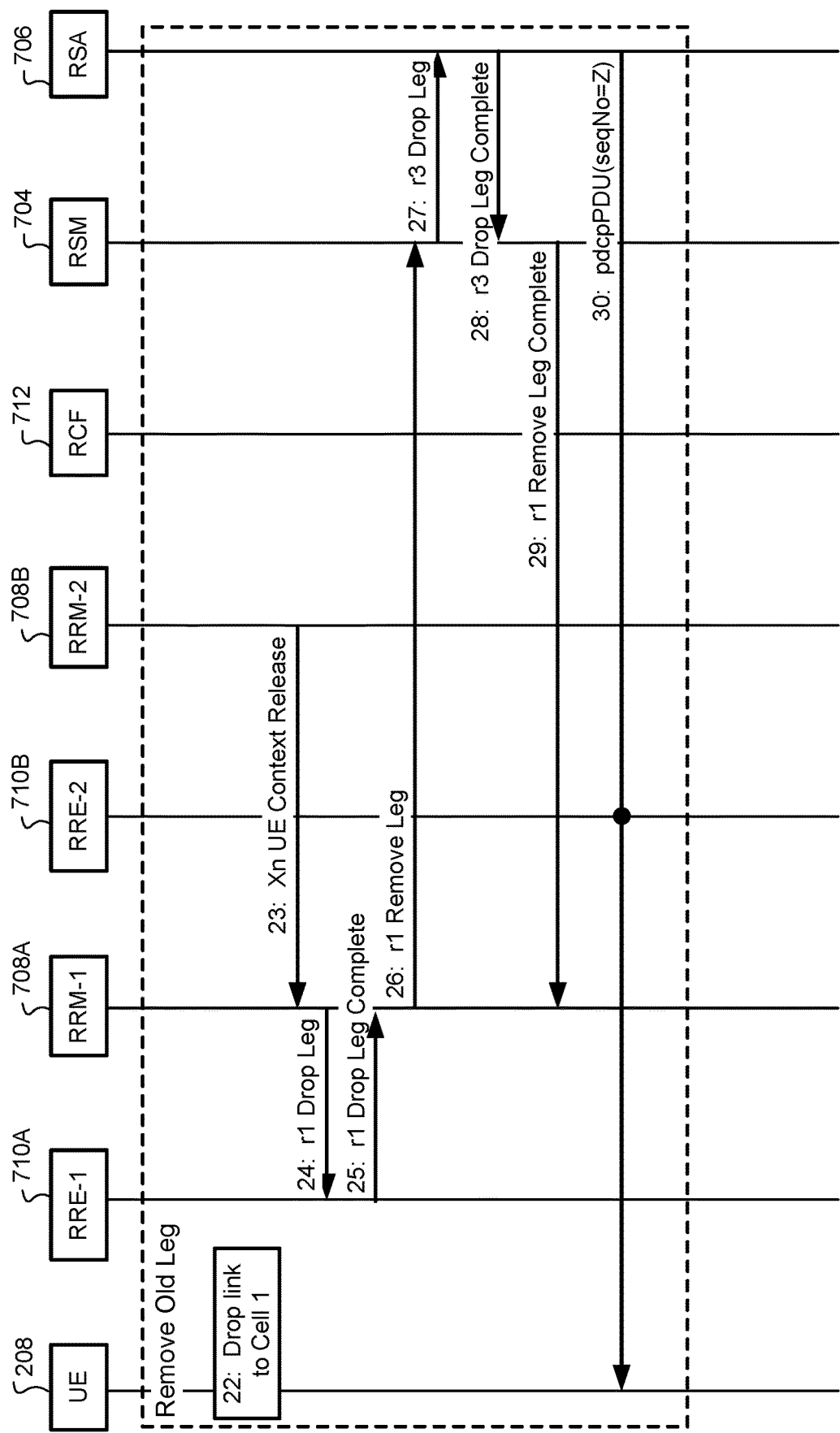

FIGS. 22A-22C show a message sequence diagram illustrating interactions between the RANN functional entities during a Session Handover (Make Before Break) procedure. Such a procedure may, for example be executed when the UE 208 moves from a cell controlled by one RRM (e.g. RRM-1 708A) to another cell controlled by a different RRM (e.g. RRM-2 708B) As may be seen in FIGS. 22A-22C, this procedure may include the following steps:

(Step 1): Optionally, RRM-1 708A and RRM-2 708B may exchange cell configuration information.

(Step 2): UE 208 sends an "rrc Measurement Report" to its current RRM (RRM-1 708A) via its current RRE (RRE-1 710A). The "rrc Measurement Report" may include a listing of cell identifiers and corresponding measurements such as Signal to Noise Ratio (SNR).

Based on this report, RRM-1 708A decides to execute a handover of the UE 208 to a cell managed by another RRM (RRM-2 708B).

(Step 3): RRM-1 708A sends an "Xn Handover Request" to RRM-2 708B. The "Xn Handover Request" message may include the identity of the target cell (cell2ID), ueID, drbID, qosConfig1, and the identity of the RSM 704 (rsm@) and RSA 706 (anchor@) as parameters.

(Step 4): RRM-2 708B sends an "r2 Add DRB" message to RRE-2 710B. The "r2 Add DRB" message may include the drbID, macConfig2, lcConfig2, qosConfig2 and anchor@ as parameters.

(Step 5): RRE-2 710B sends an "r2 Add DRB Complete" message to RRM-2 708B. The "r2 Add DRB Complete" message may include the transport layer address for use in the target cell "cell2@" as parameters.

With the hand-over preparation thus complete, the RRM-2 708B now proceeds to add a handover leg. Thus:

(Step 6): RRM-2 708B sends an "r1 Add Leg" message to the RSM 704 indicated by the rsm@ provided by RRM-1 708A. The "r1 Add Leg" message may include the ueID, drbID and cell2@ as parameters.

(Step 7): RSM 704 sends an "r3 Add Leg" message to the RSA 706. The "r3 Add Leg" message may include the drbID, cell2@ and replicate=YES as parameters. The "replicate=YES" parameter indicates that downlink user packets should be replicated to both RRE-1 710A (indicated by cell1@) and RRE-2 710B (indicated by cell2@), following the model described above with reference to FIG. 9C.

(Step 8): RSA 706 sends an "r3 Add Leg Complete" message to the RSM 704.

(Step 9): RSM 704 sends an "r1 Add Leg Complete" message to the RRM-2 708B. The "r1 Add Leg Complete" message may include rrmCryptoMaterial as a parameter.

(Step 10): RRM-2 708B derives the $K_{CP-1}$ key and associated control plane encryption and integrity protection keys.

(Step 11): RRM-2 708B sends an "Xn Handover Acknowledge" message to the RRM-1 708A. The "Xn Handover Acknowledge" message may include the drbID and rrmContainer2 as parameters.

Once the handover leg has been added, downlink (DL) PDUs destined for the UE 208 are replicated by the RSA 706 and forwarded (at Steps 12 and 13) to both RRE-1 710A (using cell1@) and to RRE-2 710B (using cell2@). Because RRE-1 710A has an active radio link connection to the UE 208, it forwards the DL PDUs to the UE 208. Because RRE-2 710B does not yet have an active radio link connection to the UE 208, it may buffer the received DL PDUs (at Step 14).

Continuing on FIG. 22B, the RRM-1 708A then proceeds to reconfigure the UE 208 and initiate the handover. Thus:

(Step 15): RRM-1 708A sends an "rrc Connection Reconfiguration" message to the UE 208 via RRE-1 710A. The "rrc Connection Reconfiguration" message may include drbID, mobility Control information and rrmContainer2 as parameters.

(Step 16): UE 208 sends an "rrc Connection Reconfiguration Complete" message to the RRM-1 708A via RRE-1 710A.

(Step 17): UE 208 derives the $K_{CP-1}$ key and associated control plane encryption and integrity protection keys for RRM-2 708B.

(Step 18): UE 208 may attach to RRE-2 710B, for example by establishing a radio link with a cell (cell2) associated with RRE-2 710B.

(Step 19): RRE-2 710B sends an "r2 Handover Complete" message to RRM-2 708B.

At this point, downlink (DL) PDUs destined for the UE 208 are replicated by the RSA 706 and forwarded (at Steps 20a and 20b) to the UE 208 via both of RRE-1 710A and RRE-2 710B. The UE 208 may discard any duplicate received PDUs (Step 21).

Continuing on FIG. 22C, the UE 208 and RRM-2 708B then proceed to remove the old leg. Thus:

(Step 22): UE 208 drops the radio link to cell 1 associated with RRE-1 710A;

(Step 23): RRM-2 708B sends an "Xn UE Context Release" message to RRM-1 708A. The "Xn UE Context Release" message may include the drbID as a parameter.

(Step 24): RRM-1 708A sends an "r2 Drop Leg" message to RRE-1. The "r2 Drop Leg" message may include the drbID as a parameter.

(Step 25): The RRE-1 710A sends an "r2 Drop Leg Complete" message to RRM-1 708A.

(Step 26): The RRM-1 708A sends an "r1 Remove Leg" message to the RSM 704. The "r1 Remove Leg" message may include the ueID, drbID and cell1@ as parameters.

(Step 27): The RSM 704 sends an "r3 Drop Leg" message to the RSA 706. The "r3 Drop Leg" message may include the drbID and cell1@ as parameters.

(Step 28): the RSA 706 terminates transmission of PDUs to the UE 208 via RRE-1 710A and sends an "r3 Drop Leg Complete" message to the RSM 704.

(Step 29): the RSM 704 sends an "r1 Remove Leg Complete" message to the RRM-1 708A.

At this point, the handover is complete and downlink (DL) PDUs destined for the UE 208 are forwarded (Step 30) by the RSA 706 to the UE 208 via RRE-2 710B only.

Based on the foregoing description, it may be appreciated that embodiments of the present invention provide a Radio Access Network Node (RANN) entity for managing communications in a public land mobile network (PLMN). The RANN entity comprises:

a plurality of RANN function entities configured to be instantiated in at least two geographically dispersed locations of the PLMN, and further configured to communicate with each other to implement the functions of the RANN entity; and one or more interface end points configured to exchange control plane and user plane messages between the RANN entity and other entities of the PLMN, each interface end point being associated with at least one RANN function entity.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by modules or functional elements specific to those steps. The respective units/modules may be implemented as specialized hardware, software executed on a hardware platform that is comprised of general purpose hardware, or a combination thereof. For instance, one or more of the units/modules may be implemented as an integrated circuit, such as field programmable gate arrays (FPGAs) or application-specific integrated circuits (ASICs). It will be appreciated that where the modules are software, they may be stored in a memory and retrieved by a processor, in whole or part as needed, individually or together for processing, in single or multiple instances as required. The modules themselves may include instructions for further deployment and instantiation.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A geographically dispersed node of a radio access network (RAN) of a Public Land Mobile Network (PLMN), the geographically dispersed node comprising:

at least one control plane entity instantiated in a first location of the PLMN, selected based on one or more control plane location selection criteria, the at least one control plane entity configured to implement control plane functions pertaining to at least one User Equipment (UE) Protocol Data Unit (PDU) session associated with a UE;

at least one user plane entity instantiated in a second location of the PLMN selected based on one or more user plane location selection criteria, the second location different than the first location, the at least one user plane entity configured to implement user plane functions pertaining to the at least one UE PDU session;

wherein the control plane location selection criteria comprises one or more of:

a location of a core network control plane entity associated with the UE;
a location of a core network control plane entity associated with the at least one UE PDU session;
a security requirement associated with the UE;
a security requirement associated with the at least one UE PDU session;
a security attribute of the first location;
a capability of the at least one control plane entity; and
a traffic load at the first location.

2. The geographically dispersed node as claimed in claim 1, wherein the at least one control plane entity is further configured to allocate the at least one UE PDU session to the at least one user plane entity.

3. The geographically dispersed node as claimed in claim 1, wherein the at least one control plane entity comprises at least one function entity selected from a list comprising:
a session management entity configured to implement protocol data unit (PDU) session management in respect of the at least one UE PDU session;
a resource management entity configured to allocate Radio Access Network (RAN) radio resources for the UE; and
a common functions entity configured to implement one or more RAN functions that pertain to the UE.

4. The geographically dispersed node as claimed in claim 3, wherein the first location corresponds with a server of either the RAN or a core network (CN).

5. The geographically dispersed node as claimed in claim 3, wherein the one or more RAN functions that pertain to the UE comprise any one or more of: paging; public warning system broadcasts; and system information broadcasts.

6. The geographically dispersed node as claimed in claim 1, wherein the at least one user plane entity comprises at least one function entity selected from a list comprising:
a radio edge entity configured to transmit and receive signals over a radio link between the geographically dispersed node and the UE;
a session anchor entity configured to convey user plane data between the radio edge entity and a core network (CN) user plane function (UPF) for the at least one UE PDU session.

7. The geographically dispersed node as claimed in claim 6, wherein the second location corresponds with any one of: an access node of the radio access network (RAN); a server of the RAN; and a server of the CN.

8. The geographically dispersed node as claimed in claim 6, wherein the at least one user plane entity comprises respective different user plane entities for each one of uplink (UL) traffic and downlink (DL) traffic associated with a particular UE PDU session.

9. The geographically dispersed node as claimed in claim 1, wherein the control plane location selection criteria further comprises:
a current location of the UE.

10. The geographically dispersed node as claimed in claim 1, wherein the user plane location selection criteria comprises one or more of:
a current location of the UE;
a location of the at least one control plane entity;
a location of a core network user plane entity associated with the UE;
a location of a core network user plane entity associated with the at least one UE PDU session;
a security requirement associated with the UE;
a security requirement associated with the at least one UE PDU session;
a user plane traffic requirement of the UE;
a user plane traffic requirement of the at least one UE PDU session;
a capability of the at least one user plane entity;
a security attribute of the second location; and
a traffic load at the second location.

11. A method at a node of a radio access network (RAN) of a Public Land Mobile Network (PLMN), the method comprising:
instantiating at least one control plane entity in a first location of the PLMN selected based on one or more control plane location selection criteria, the at least one control plane entity configured to implement control plane functions pertaining to at least one User Equipment (UE) Protocol Data Unit (PDU) session associated with a UE; and
instantiating at least one user plane entity in a second location of the PLMN different than the first location selected based one or more user plane location selection criteria, the at least one user plane entity configured to implement user plane functions pertaining to the at least one UE PDU session;
wherein the control plane location selection criteria comprises one or more of:
a location of a core network control plane entity associated with the UE;
a location of a core network control plane entity associated with the at least one UE PDU session;
a security requirement associated with the UE;
a security requirement associated with the at least one UE PDU session;
a security attribute of the first location;
a capability of the at least one control plane entity; and
a traffic load at the first location.

12. The method as claimed in claim 11, wherein the at least one control plane entity is further configured to allocate the at least one UE PDU session to the at least one user plane entity.

13. The method as claimed in claim 11, wherein instantiating at least one control plane entity comprises instantiating at least one function entity selected from a list comprising:
a session management entity configured to implement protocol data unit (PDU) session management in respect of the at least one UE PDU session;
a resource management entity configured to allocate Radio Access Network (RAN) radio resources for the UE; and
a common functions entity configured to implement one or more RAN functions that pertain to the UE.

14. The method as claimed in claim 13, wherein the first location corresponds with a server of either the RAN or a core network (CN).

15. The method as claimed in claim 13, wherein the one or more RAN functions that pertain to the UE comprise any one or more of: paging; public warning system broadcasts; and system information broadcasts.

16. The method as claimed in claim 11, wherein instantiating at least one user plane entity comprises instantiating at least one function entity selected from a list comprising:
a radio edge entity configured to transmit and receive signals over a radio link between the geographically dispersed node and the UE;
a session anchor entity configured to convey user plane data between the radio edge entity and a core network (CN) user plane function (UPF) for the at least one UE PDU session.

17. The method as claimed in claim 16, wherein the second location corresponds with any one of: an access node of the radio access network (RAN); a server of the RAN; and a server of the CN.

18. The method as claimed in claim 16, wherein instantiating at least one user plane entity comprises instantiating respective different user plane entities for each one of uplink (UL) traffic and downlink (DL) traffic associated with a particular UE PDU session.

19. The method as claimed in claim 11, wherein the control plane location selection criteria further comprises:
    a current location of the UE.

20. The method as claimed in claim 11, wherein the user plane location selection criteria comprises one or more of:
    a current location of the UE;
    a location of the at least one control plane entity;
    a location of a core network user plane entity associated with the UE;
    a location of a core network user plane entity associated with the at least one UE PDU session;
    a security requirement associated with the UE;
    a security requirement associated with the at least one UE PDU session;
    a user plane traffic requirement of the UE;
    a user plane traffic requirement of the at least one UE PDU session;
    a capability of the at least one user plane entity;
    a security attribute of the second location; and
    a traffic load at the second location.

\* \* \* \* \*